(12) United States Patent
Takenaka et al.

(10) Patent No.: US 8,433,913 B2
(45) Date of Patent: *Apr. 30, 2013

(54) APPARATUS, METHOD, AND PROGRAM FOR DIGITAL SIGNATURE

(75) Inventors: Masahiko Takenaka, Kawasaki (JP); Tetsuya Izu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

This patent is subject to a terminal disclaimer.

(21) Appl. No.: 12/645,469

(22) Filed: Dec. 22, 2009

(65) Prior Publication Data

US 2010/0169653 A1    Jul. 1, 2010

(30) Foreign Application Priority Data

Dec. 26, 2008 (JP) ................................. 2008-333358

(51) Int. Cl.
*H04L 9/32* (2006.01)

(52) U.S. Cl.
USPC ........................................................ 713/179

(58) Field of Classification Search .................. 713/176, 713/179, 180

See application file for complete search history.

(56) References Cited

U.S. PATENT DOCUMENTS

2005/0015600 A1 * 1/2005 Miyazaki et al. ............. 713/176
2006/0117183 A1 * 6/2006 Hatano et al. ................. 713/176

FOREIGN PATENT DOCUMENTS

JP   2004-364070 A   12/2004
JP   2006-060722 A    3/2006

OTHER PUBLICATIONS

Benaloh, Josh et al., "One-way accumulators: A decentralized alternative to digital signatures", *EUROCRYPT '93* May 23, 1993, p. 274-285.
Boneh, Dan et al., "Aggregate and Verifiably Encrypted Signatures from Bilinear Maps", *EUROCRYPT* 2003 May 4, 2003, p. 416-432.
Lysyanskaya, Anna et al., "Sequential Aggregate Signatures from Trapdoor Permutations", *EUROCRYPT* 2004 May 2, 2004, p. 74-90.
Sano, Makoto et al., "On Sanitizable and Deletable Signature Schemes", *Proceedings of Symposium on Cryptography and Information Security (SCIS) 2007* Jan. 23, 2007, p. 156 (partial translation).
USPTO, [TRAN], U.S. Appl. No. 12/688,952 (related), [NOA] Notice of Allowance issued on Feb. 1, 2013.
USPTO, [TRAN], U.S. Appl. No. 12/688,952 (related), [CTNF] Non-Final Office Action issued on Mar. 12, 2012.

* cited by examiner

*Primary Examiner* — Ellen Tran
(74) *Attorney, Agent, or Firm* — Fujitsu Patent Center

(57) ABSTRACT

A digital signature method to generate a signature for an electronic document, the method including: initializing a signature t of each of the document segments of electronic document and twice raising the signature t to the power of a hash value of each of the document segments and digitally signing the raised signature to produce a signature s serving as the signature of the electronic document; and revising a document segment; wherein, in the revising, to delete a document segment, the signature t is raised twice to the power of the hash value of the document segment unless the document segment is sanitization prohibited, or the signature t is raised to the power of the hash value of the document if the document segment is sanitization prohibited, and the document segment is deleted; to sanitize a document segment, the document segment is replaced with the hash value thereof.

15 Claims, 27 Drawing Sheets

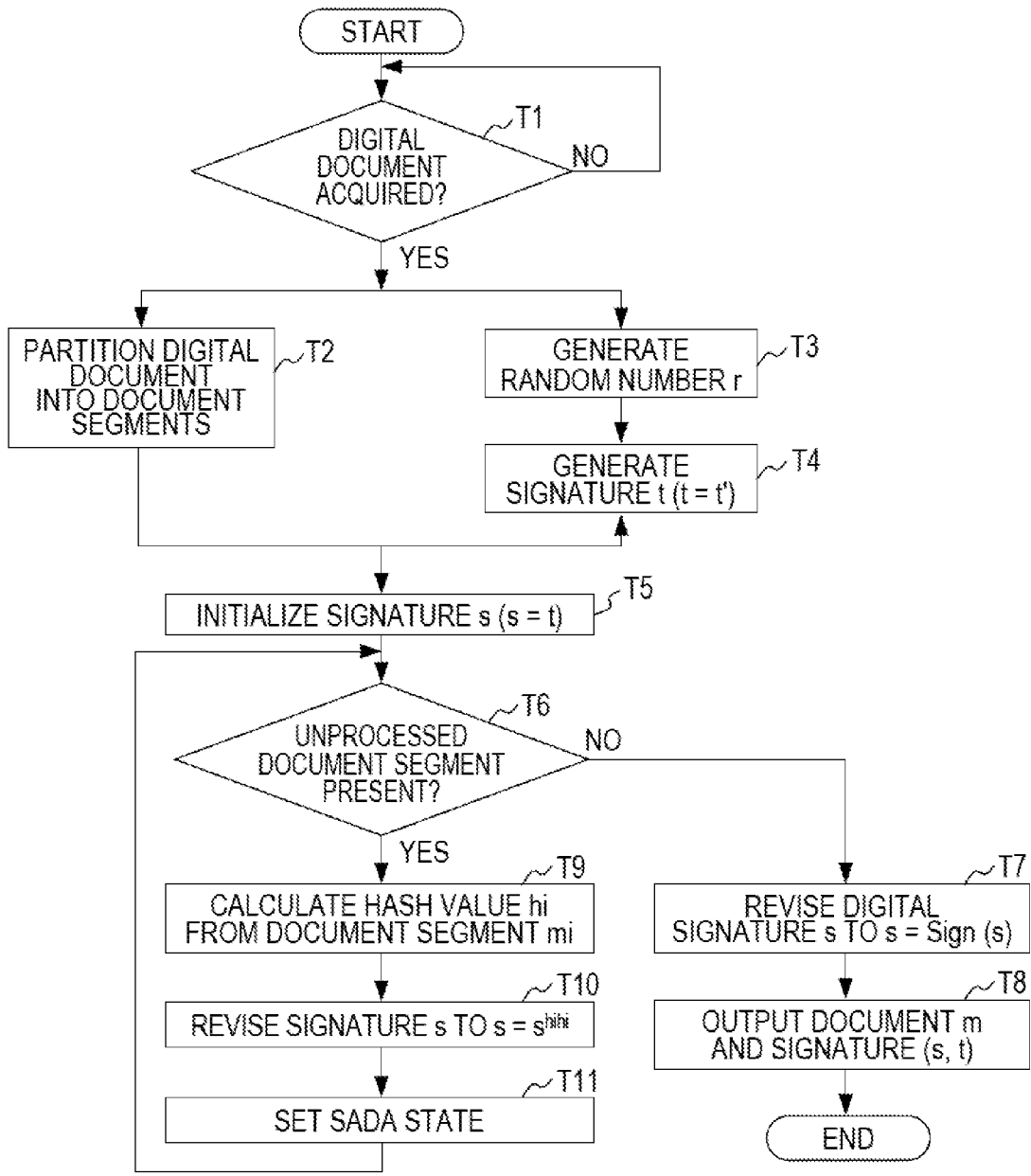

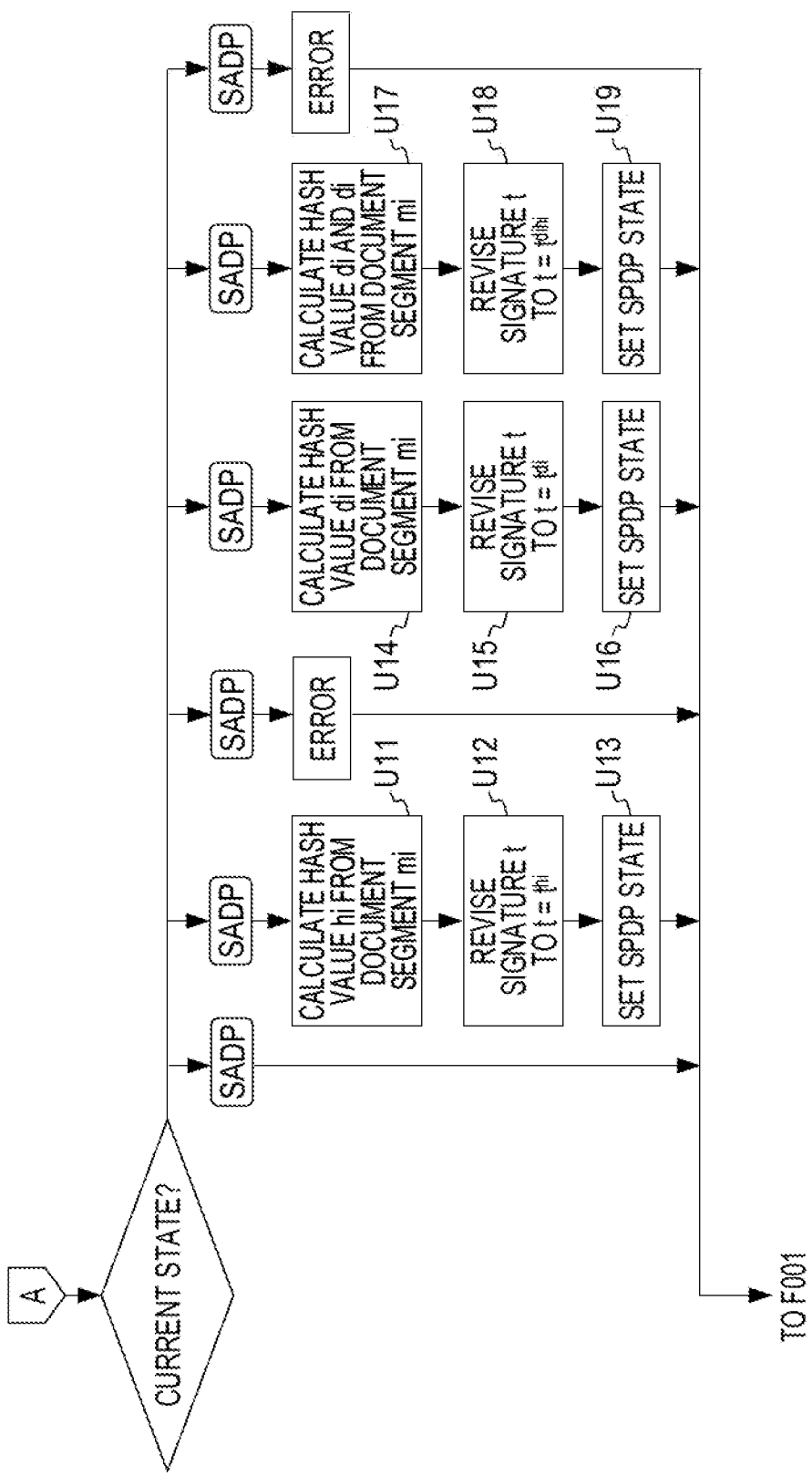

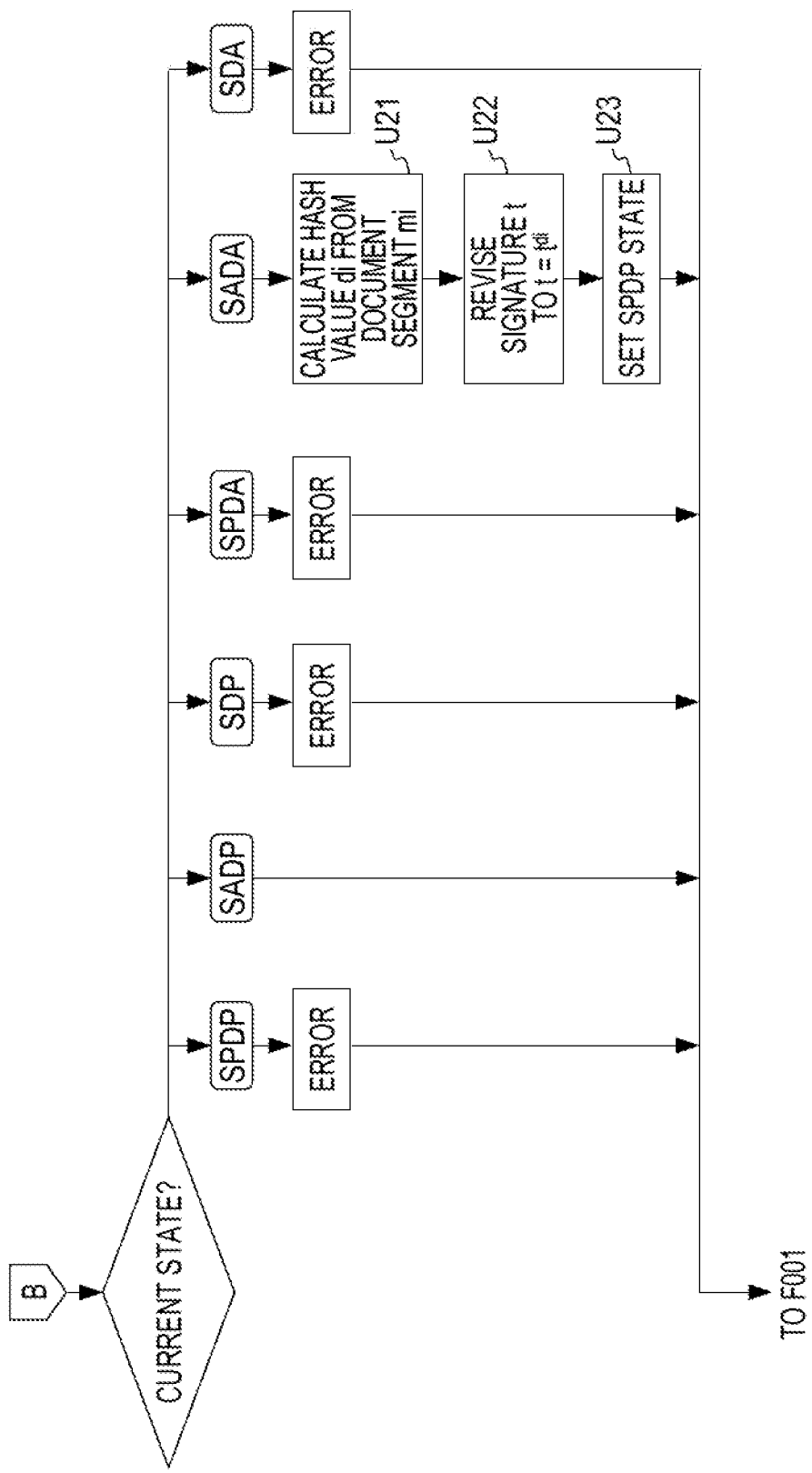

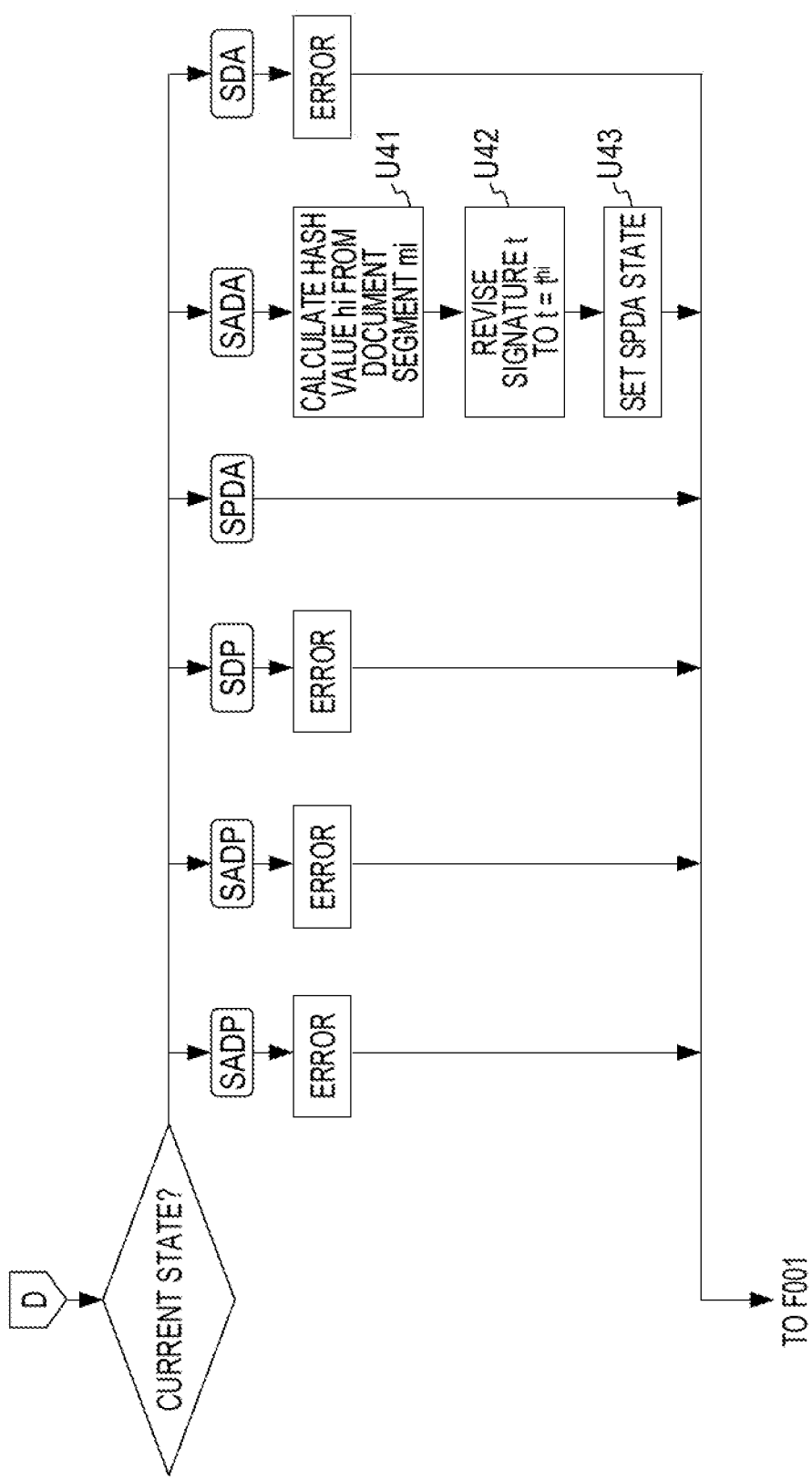

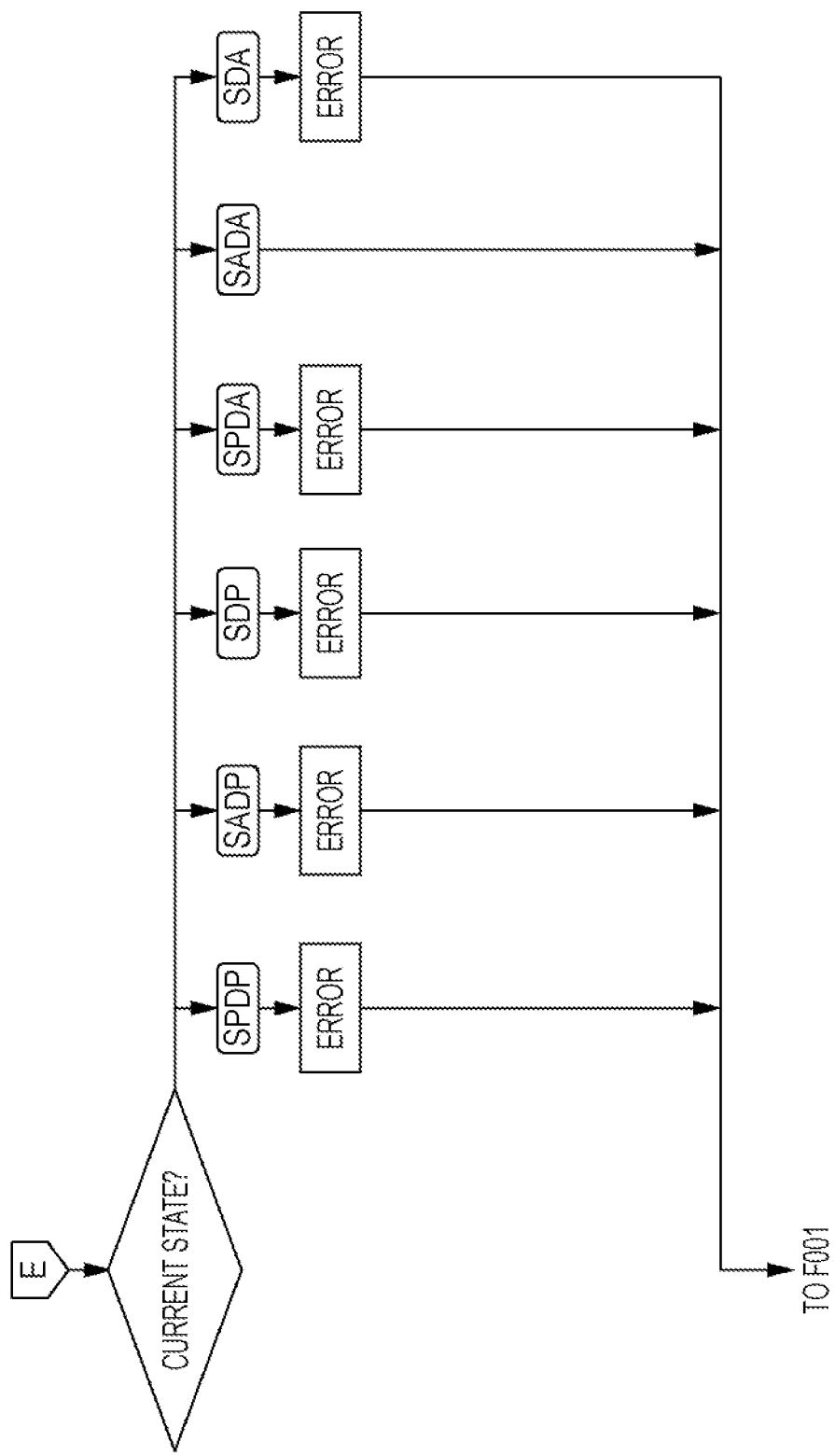

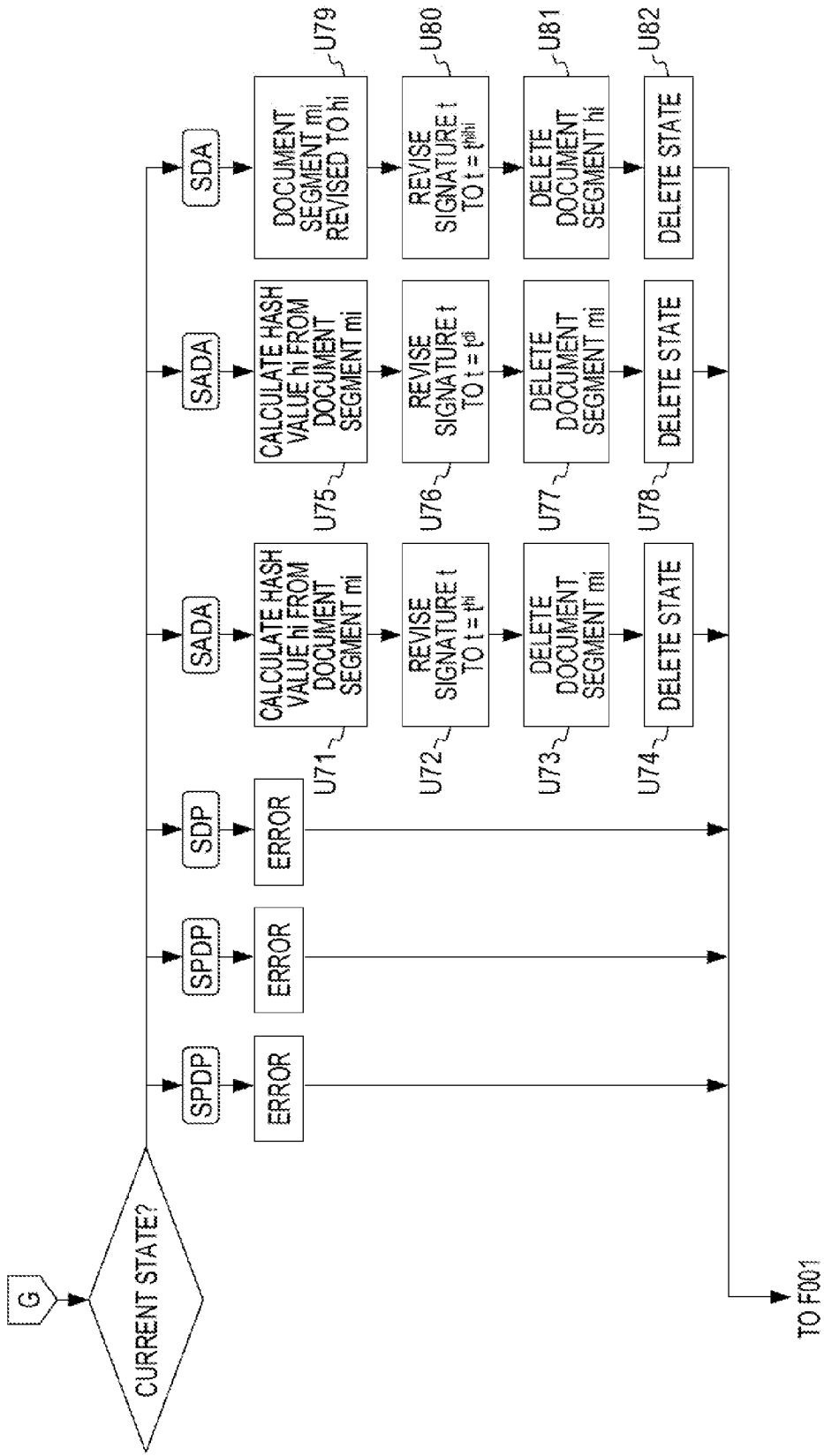

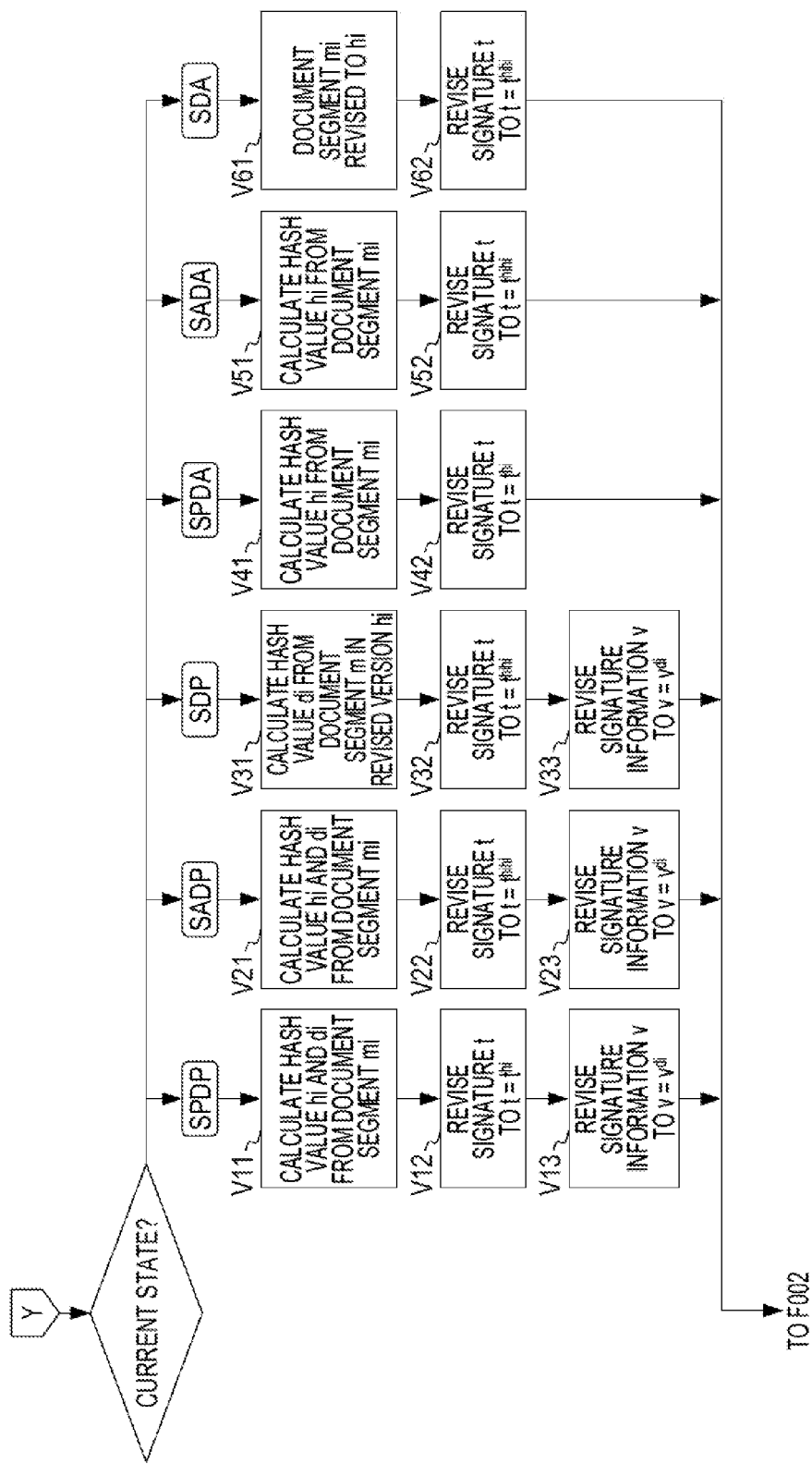

FIG. 9

| STATE | STATE OF DOCUMENT SEGMENT | RELATIONSHIP OF STATE OF SIGNATURE t WITH SADA | |
|---|---|---|---|
| SADA | mi | t | ($t^r$) |
| SPDA | mi | $t = t^{hi}$ | ($t^{rhi}$) |
| SADP | mi | $t = t^{di}$ | ($t^{rdi}$) |
| SPDP | mi | $t = t^{hidi}$ | ($t^{rhidi}$) |
| SDA | hi | $t = t$ | ($t^r$) |
| SDP | hi | $t = t^{di}$ | ($t^{rdi}$) |
| D | × | $t = t^{hihi}$ | ($t^{rhihi}$) |

FIG. 10

| STATE TRANSITION | DOCUMENT SEGMENT | SIGNATURE t | STATE TRANSITION | DOCUMENT SEGMENT | SIGNATURE t |
|---|---|---|---|---|---|
| T1 | mi | $t = t^{hi}$ | T7 | mi | $t = t^{di}$ |
| T2 | mi | $t = t^{hidi}$ | T8 | mi→× | $t = t^{hi}$ |
| T3 | mi | $t = t^{di}$ | T9 | mi | $t = t^{hi}$ |
| T4 | mi→hi | $t = t^{di}$ | T10 | mi→hi | $t = t$ |
| T5 | mi→hi | $t = t$ | T11 | hi | $t = t^{di}$ |
| T6 | mi→× | $t = t^{hihi}$ | T12 | mi→× | $t = t^{hihi}$ |

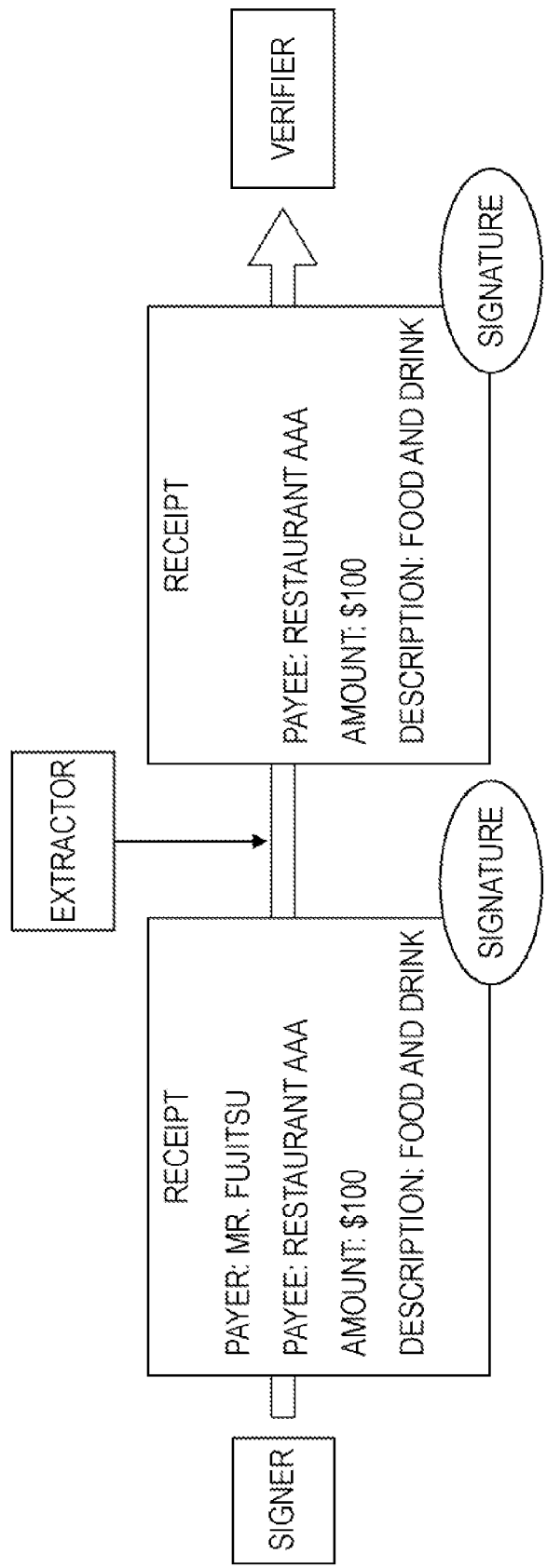

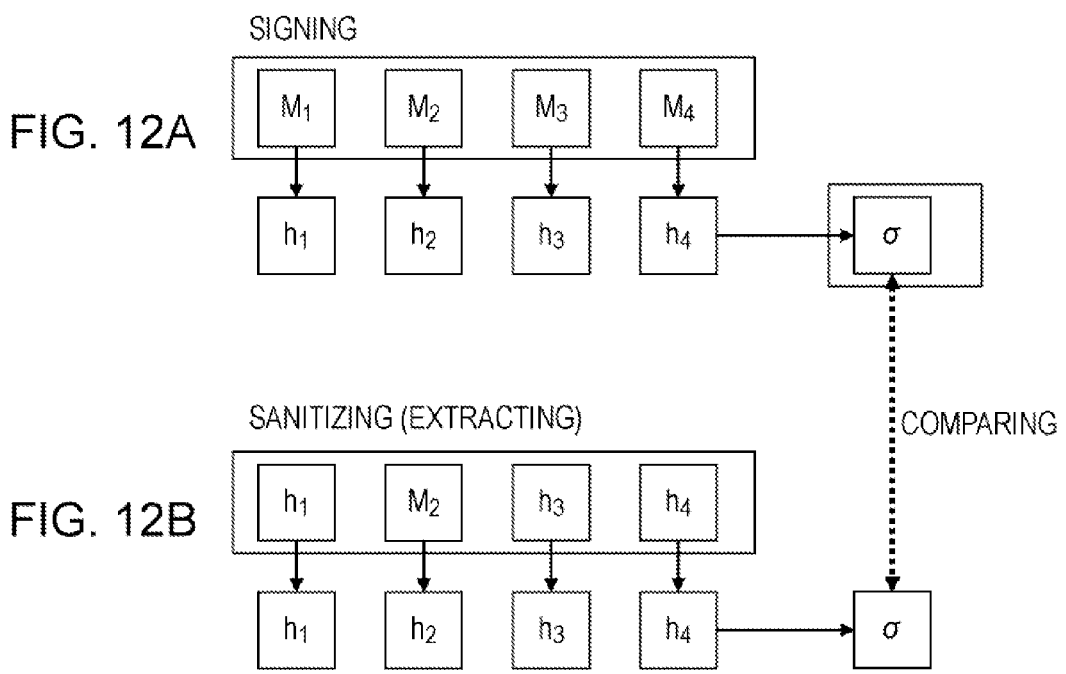

APPARATUS, METHOD, AND PROGRAM FOR DIGITAL SIGNATURE

CROSS-REFERENCE TO RELATED APPLICATIONS

This application is based upon and claims the benefit of priority from the prior Japanese Patent Application No. 2008-333358 filed on Dec. 26, 2008, the entire contents of which are incorporated herein by reference.

FIELD

The present invention relates to an apparatus, method, and program for digital signature.

BACKGROUND

Digital signature technique is available to guarantee the integrity of an electronic document. In the field of the applications of electronic documents, there is an increasing need for partially extracting a signed electronic document. Since the extraction of the electronic document means altering the electronic document in the application of digital signature, the integrity of the document cannot be guaranteed. To overcome this problem, partial extraction techniques of digital signature such as sanitization signature or deletion signature has been developed. These techniques guarantee the integrity of a portion of the electronic document even if the portion is extracted.

Extraction signature is defined here. In a standard digital signature, a two-party model is used. The two-party model includes a signer who signs and a verifier who verifies the digital signature. In contrast, in the extraction signature, a three-party model is used. The three-party model includes a signer who signs a electronic document, an extractor who extracts a portion of the electronic document signed by the signer, and a verifier who verifies the extracted document as illustrated in FIG. 11. The signer signs the electronic document in any available method. The extractor receives the electronic document and the signature. The extractor then extracts a portion of the electronic document, and generates extraction information related to the extraction operation and updates the signature. The verifier then receives the extracted document, the signature, and the extraction information. Based on the extracted document, the signature, and the extraction information, the verifier verifies that the extracted document is the portion of the electronic document signed by the signer. A signature method satisfying the above-described process flow is defined as an extraction signature.

In order to perform the sanitization signing or the deletion signing, an electronic document is partitioned into a plurality of document segments, and the whole or part of a signing process is performed on the document segments. The size of information of a signature in the sanitization signature and the deletion signature in the related art increases substantially in proportion to the number of document segments during the signing operation. The sanitization signature and the deletion signature in the related art need to have extraction information of an amount proportional to the number of document segments to be extracted during extraction or the number of document segments to be deleted during deletion. A large amount of signature information or a large amount of extraction information is needed to extract part of a large-volume document. In other words, data efficiency of a signature is very low.

SUMI-4 is well known as a sanitization signature. SUMI-4 is disclosed in Japanese Unexamined Patent Application Publication No. 2004-364070. In this signature scheme, only one signature is used regardless of the number of document segments. In this signature scheme, however, a hash value group of document segments to be deleted during extraction is needed. The size of extraction information becomes large in proportion to the number of deleted document segments.

How the information size becomes large is discussed with reference to FIGS. 12A and 12B. During the signing operation, document information M is partitioned into document segments $m_1$-$m_4$. Each document segment is tagged with document segment ID information $ID_1$-$ID_4$. ID tagged document segments $M_1$-$M_4$ thus result. A signer calculates hash values $h_1$-$h_4$, signs the hash values $h_1$-$h_4$ (signature G), and sends the ID tagged document segments $M_1$-$M_4$ and the signature G to an extractor. During extraction, the extractor decides on an ID tagged document segment to be extracted. The extractor here may wish to extract the ID tagged document segment $M_2$. The extractor calculates the hash values $h_1$, $h_3$, and $h_4$ of the ID tagged document segments $M_1$, $M_3$, and $M_4$ to be deleted, namely, not to be extracted, and discloses $h_1$, $M_2$, $h_3$, and $h_4$ and the signature G of the signer. In other words, the hash values $h_1$, $h_3$, and $h_4$ are disclosed in place of the ID tagged document segments $M_1$, $M_3$, and $M_4$ to be deleted. During signature verification, a verifier calculates the hash value $h_2$ from the disclosed ID tagged partial information $M_2$, restores the hash values $h_1$-$h_4$ together with the disclosed hash values $h_1$, $h_3$, and $h_4$ and then verifies the hash values $h_1$-$h_4$ with the signature $\sigma$. Since the signature $\sigma$ is a signature with which the signer signs the hash values $h_1$-$h_4$, the verifier can verify that the extracted ID tagged document segment $M_2$ is part of the document M signed by the signer. If the hash value is not disclosed in place of the ID tagged document segment to be deleted, the verifier cannot verify in the extraction that the extracted ID tagged document segment $M_2$ is part of the document M signed by the signer. For this reason, the "extraction information" as information of an amount proportional to the number of document segments to be deleted needs to be stored. If the number of ID tagged document segments to be deleted increases, the size of extraction information to be stored becomes large.

SUMI-6 is known as a deletion signature. SUMI-6 is disclosed in Japanese Unexamined Patent Application Publication No. 2006-60722. During a signing process, this signature scheme uses partial signatures responsive to document segments and an aggregate signature in which the partial signatures are aggregated. The amount of signature information increases in proportion to the number of document segments.

How the amount of signature information increases is described with reference to FIGS. 13A and 13B. In the same way as illustrated in FIGS. 12A and 12B, a signer partitions document information M into document segments $m_1$-$m_4$, tags the document segments $m_1$-$m_4$ with document segment IDs $ID_1$-$ID_4$ to generate ID tagged document segments $M_1$-$M_4$. A signer calculates hash values $h_1$-$h_4$, calculates partial signatures $\sigma_1$-$\sigma_4$ in aggregate signing to be discussed later, and aggregate the partial signatures $\sigma_1$-$\sigma_4$ in order to generate an aggregate signature $\sigma$. The signer finally sends to an extractor the ID tagged document segments $M_1$-$M_4$, the partial signatures $\sigma_1$-$\sigma_4$, and the aggregate signature G. During extraction, the signer decides on an ID tagged document segment to be extracted. The signer may wish to extract the ID tagged document segment $M_2$ now. The extractor deletes the ID tagged document segment $M_1$, $M_3$, and $M_4$ not to be extracted, deletes information of $\sigma_1$, $\sigma_3$, and $\sigma_4$ from the aggregate signature G using the corresponding partial signatures $\sigma_1$, $\sigma_3$, and $\sigma_4$, and updates the aggregate signature to be $\sigma'$. The extractor finally discloses the extracted ID tagged document segment $M_2$, the partial signature $\sigma_2$, and the updated aggregate signature $\sigma'$. During signature verification, a verifier performs a verification operation with the ID tagged document segment $M_2$ and the updated aggregated signature $\sigma'$. The signature $\sigma'$ results from deleting, from the aggregate signature G of the signer, information of the partial signatures of the ID tagged document segments $M_1$, $M_3$, and $M_4$ deleted by the extractor. For this reason, the verifier can verify that the extracted ID tagged document segment $M_2$ is part of the document M signed by the signer.

In this signature scheme, partial signature information is added in the signing operation. Signature information in an amount proportional to the number of document segments to be signed is stored. In other words, the larger the number of ID tagged document segments to be signed, the larger the size of signature information to be stored.

In the sanitization signature based extraction, the number of signatures is one (small amount of data) in the signing operation, but extraction information for the number of document segments to be deleted is to be stored in addition to the signature at the extraction (large amount of data). In the deletion signature based extraction, an extraction document, an partial signature therefore, and an updated aggregate signature are sufficient (small amount of data) at the extraction. During signing, partial signatures for the document segments in addition to the "aggregate signature" are stored (large amount of data).

On the other hand, a digital signature application technique called "aggregate signature" is also available. If one signer or a plurality of signers signs one electronic document or a plurality of electronic documents in the circulation of the electronic documents, the signatures may be aggregated in order to reduce an amount of signature data.

The representative characteristics of the aggregate signature are described. A plurality of persons may sign a plurality of documents. Signature data of the number of units equal to the number of documents is used in ordinary digital signature as illustrated in FIG. 14. In contrast, if the aggregate signature is used, the signatures of the documents are aggregated into a single signature as illustrated in FIG. 15. In other words, the amount of signature data is reduced.

A sequential aggregate signature based on RSA signature is currently known. The sequential aggregate signature is disclosed in the paper entitled "Sequential Aggregate Signatures from Trapdoor Permutations," contributed by A. Lysyanskaya, et. al., EUROCRYPT 2004, LNCS 3027, pp. 74-90, 2004. Also known is a general aggregate signature. The general aggregate signature is based on pairing as one of the elliptic curve cryptography techniques, described in the paper entitled "Aggregate and Verifiability Encrypted Signature from Bilinear Maps," contributed by D. Bone, et. al., EUROCRYPT 2003, LNCS 2656, pp. 416-432, 2003. The general aggregate signature is used in the above-described deletion signature.

The technique called RSA accumulator is disclosed in the paper entitled "One-way accumulators: A Decentralized Alternative to Digital Signatures," contributed by J. Benaloh, and M. de Mare, EUROCRYPT '93, LNCS 765, pp. 274-285, Springer-Verlag, 1994. The RSA accumulator is one type of hash function based on the RSA cryptography, and has an aggregation function. As the RSA cryptography, the RSA accumulator uses N which is a product of two prime numbers p and q. The RSA accumulator also uses element g mutually prime to N, and the order of the element g, $\phi$=LCM(p−1)(q−1). The RSA accumulator has a pseudo-commutative property based on the integrity of the RSA assumption. If function f:X*Y→X satisfies the following features under the condition of all x∈X and all y1 and y2∈Y, the function is considered as having the pseudo-commutative property:

$$f(f(x,y1),y2)=f(f(x,y2),y1)$$

If the function f is repeatedly applied, the order of y is modifiable, i.e., commutative. The RSA accumulator in the above-described document embodies the function f as fN(x, y)=*h$^{(y)}$ mod N. Here, H represents a one-way hash function, such as SHA 1.

In the RSA accumulator, the following equation holds:

$$g^{H(y1)*H(y2)} \bmod N = (g^{H(y1)} \bmod N)^{H(y2)} \bmod N$$

$$= (g^{H(y2)} \bmod N)^{H(y1)} \bmod N$$

In other words, the hash values are aggregated in random order. Since the RSA accumulator has a one-way feature, it is difficult to calculate x from ($g^{H(y)}$ mod N) and H(y), N (so-called the RSA assumption).

Each of the above-described sanitization signature techniques, the deletion signature technique, and sanitization and deletion signature technique can set a variety of states related to sanitization and deletion on each document segment. The states set to each document segment are described below. The related technique is disclosed in the paper entitled "On sanitizable and deletion signature schemes," M. Sano, T. Izu, N. Kunihiro, K. Ohta, and M. Takenaka, Symposium on Cryptography and Information Security, pp. 156, January 2007.

FIG. 16 illustrates document segment states and state transitions. Referring to FIG. 16, a chart 3400 denotes a variety of states settable on each document segment. More specifically, FIG. 16 illustrates six states responsive to combinations of a prohibited attribute, an allowed attribute, and a sanitized or deleted attribute related to the sanitization and the deletion.

The six states includes a sanitization allowed and deletion allowed (SADA) state, a sanitization prohibited and deletion prohibited (SPDP) state, a sanitization allowed and deletion prohibited (SADP) state, a sanitized and deletion allowed (SDA) state, a sanitized and deletion prohibited (SDP) state, and a deleted (D) state.

Nine state transitions Ta-Ti are also illustrated to represent state transitions between the states. For example, the state transition Ta represents a transition from the SADA state where the document segment is sanitization allowed and deletion allowed to the SPDP state where the document segment is sanitization prohibited and deletion prohibited.

The six states and the nine state transitions are not set in each document segment as a property but are physically set through a data storage method. In this way, the document segment may be set in a variety of states depending on whether the document segment is to be disclosed, not to be disclosed, or to be revised. An information leak of a electronic document due to an error in the setting of the property is thus controlled.

SUMMARY

According to an aspect of the invention, a digital signature method for causing a computer to generate a signature for an electronic document, the method including: partitioning a target electronic document into a plurality of document segments; initializing a signature t of each of the document segments and twice raising the signature t to the power of a hash value of each of the document segments and digitally signing the raised signature to produce a signature s serving as the signature of the electronic document; and revising a document segment; wherein, in the revising, to delete a document segment, the signature t is raised twice to the power of the hash value of the document segment to be deleted unless the document segment is sanitization prohibited, or the signature t is raised to the power of the hash value of the document to be deleted if the document segment is sanitization prohibited, and the document segment is deleted; to sanitize a document segment, the document segment is replaced with the hash value thereof; to prohibit a document segment from being deleted, the signature t is raised to the power of a double hash value of the document segment to be prohibited from being deleted; and to prohibit a document segment from being sanitized, the signature t is raised to the power of the hash value of the document segment to be prohibited from being sanitized.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating a signing process.

FIG. 7B is a second flowchart illustrating the revising process.

FIG. 7C is a third flowchart illustrating the revising process.

FIG. 7E is a fifth flowchart illustrating the revising process.

FIG. 7F is a sixth flowchart illustrating the revising process.

FIG. 7H is an eighth flowchart illustrating the revising process.

FIG. 8B is a second flowchart illustrating the verification process.

FIG. 9 illustrates seven states implemented in accordance with one embodiment.

FIG. 10 illustrates transitions of the states in accordance with one embodiment.

FIG. 11 diagrammatically illustrates the concept of extraction signature.

FIG. 12A is a first chart illustrating problems of a sanitization signature technique in the related art.

FIG. 12B is a second chart illustrating problems of the sanitization signature technique in the related art.

DESCRIPTION OF EMBODIMENTS

In accordance with the previously described related art, however, a document segment may not be revised to be in a sanitization prohibited and deletion allowed (SPDA) state. A user may wish to revise a document segment to be sanitation prohibited and deletion allowed for some reason, but that document segment may not be set to be in a sanitization prohibited and deletion allowed state. In other words, the related art lacks user friendliness.

Figure 17A:
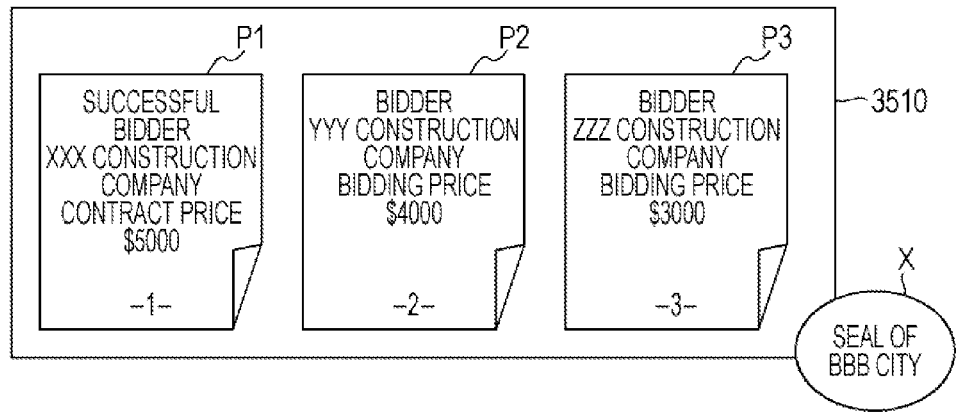
FIG. 17A is a first chart illustrating a problem of the related art presented when seven states of a document segment are not displayed.
Figure 17B:
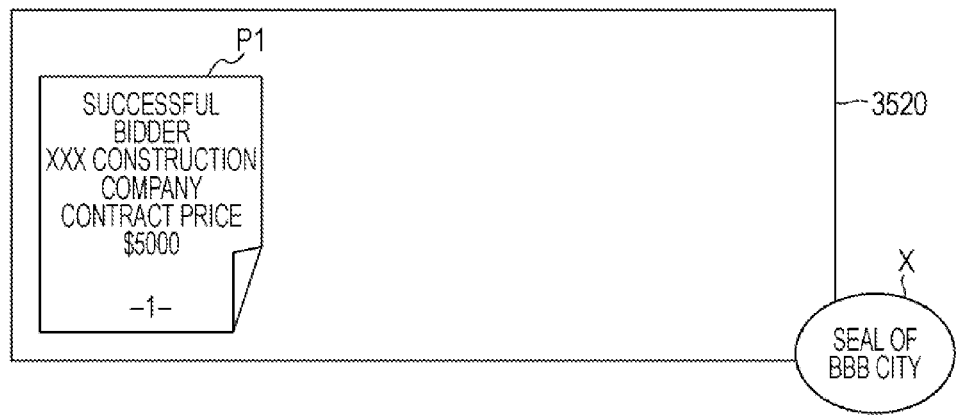
FIG. 17B is a second chart illustrating a problem of the related art presented when the seven states of the document segment are not displayed.
Figure 17C:
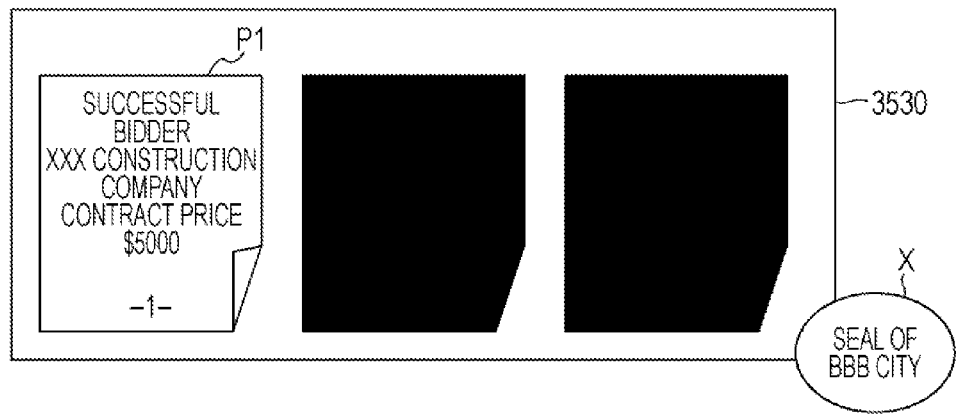
FIG. 17C is a third chart illustrating a problem of the related art presented when the seven states of the document segment are not displayed.

The problems of the previously described related art are specifically discussed here. FIGS. 17A-17C illustrate one problem of the related art. An original document 3510 illustrated in FIG. 17A is a electronic document representing the results of a public bid of public works performed by BBB city. More specifically, page 1 of the document posts information including the name of a successful bidder "XXX construction company" and a contract price "$5,000."

Page 2 of the document posts information including the name of another bidder "YYY construction company" and a bidding price "$4,000." Page 3 of the document posts information including the name of another bidder "ZZZ construction company" and a bidding price "$3,000." The original document 3510 is also associated with a digital signature X representing the seal of the BBB city. Pages 1 through 3 are document segments P1 through P3, respectively.

If the original document 3510 is disclosed as is in response to a request to disclose the bid results, private information such as the names of the bidders and the bidding prices posted on the document segment P2 and the document segment P3 is automatically disclosed. In such a case, keeping the original document 3510 partially secret is desired in order to protect the private information.

The original document 3510 is revised using the sanitization and deletion signature technique. The original document 3510 is thus partially hidden. A revised document 3520 illustrated in FIG. 17B is formed by deleting from the original document 3510 the confidential private information. Even if the revised document 3520 is publicly disclosed, the private information that is confidential is deleted. A viewer may not identify the specific content of the document segments P2 and P3. The private information is thus properly protected, and the revised document 3520 becomes a desirable document.

A revised document 3530 illustrated in FIG. 17C is formed by sanitizing the original document 3510 with the confidential private information blacked out. A viewer may not identify the specific content of the document segments P2 and P3. However, the number of bidders may be estimated based on the sanitized document segments P2 and P3. Complete integrity may not be guaranteed. The revised document 3530 is not necessarily desirable.

To overcome such a problem, the document segments P2 and P3 are set to be in a sanitization prohibited and deletion allowed (SPDA) state during the production of the original document 3510. There is a desire for a technique to avoid the selection of the sanitization as a way to hide the document segments P2 and P3.

To overcome the problem of the related art, a document segment of a electronic document is set to be in a sanitization prohibited and deletion allowed state with an amount of the electronic document reduced during signing and revising of the electronic document. It is an object of the present invention to provide a digital signature technique that provides the integrity of the electronic document.

First Underlying Technique

The signature schemes related to techniques underlying the present invention are described first.

Introduction of the RSA Accumulator in the Sanitization Signature

Figure 18A:
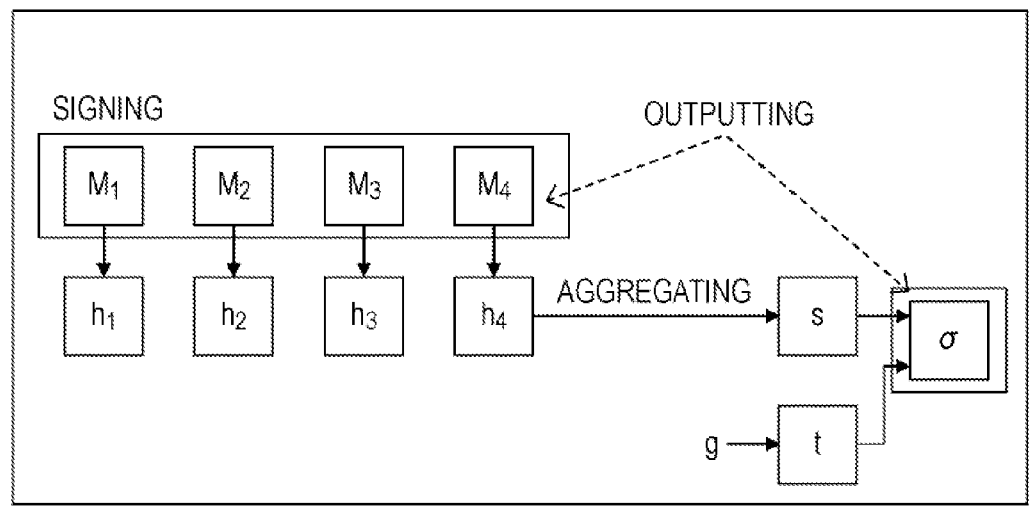
FIG. 18A is a first chart illustrating the concept of a first underlying signature method.
Figure 18B:
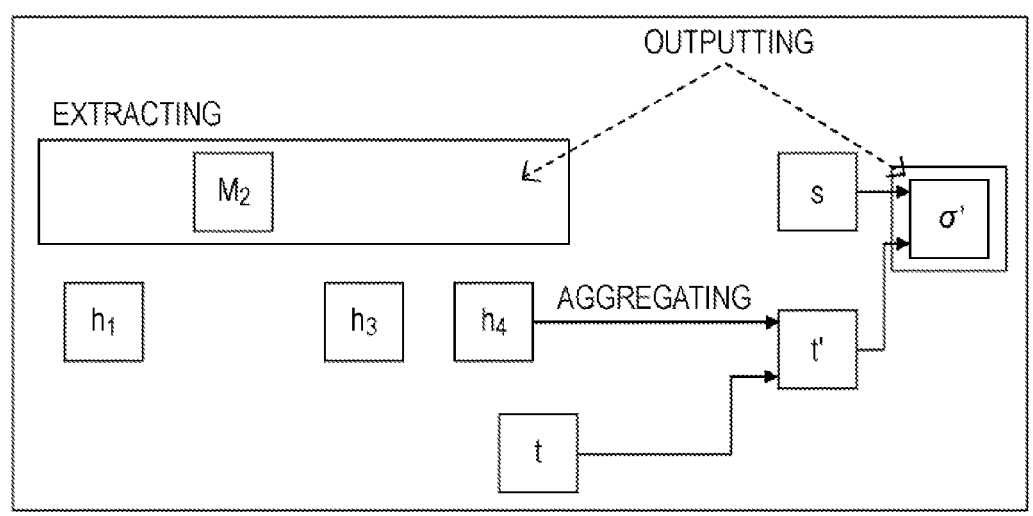
FIG. 18B is a second chart illustrating the concept of the first underlying signature method.

The RSA accumulator is introduced in a sanitization signature process. Referring to FIGS. 18A and 18B, the sanitization signature is discussed. In the sanitization signature illustrated in FIGS. 18A and 18B, a hash value in an ID tagged document is signed. More specifically, a value $h_1 \| h_2 \| h_3 \| h_4$ concatenating the hash values $h_1$-$h_4$ of the ID tagged document segments $M_1$-$M_4$ is signed. Here, the symbol "∥" represents an concatenation operation. Let σ represent a signing operation as $\sigma v = \text{Sign}(H(h_1 \| h_2 \| h_3 \| h_4))$. If the hash values are concatenated and then signed, the integrity of all the information $h_1$-$h_4$ is guaranteed. However, since part $H(h_1 \| h_2 \| h_3 \| h_4)$ is not pseudo-commutative, $H(h_1 \| h_2 \| h_3 \| h_4)$ may not be derived from $H(h_1 \| h_2 \| h_3)$ and $h_4$. Since a signature verification operation is performed based on Verify (σ,H $(h_1 \| h_2 \| h_3 \| h_4)$) and $H(h_1 \| h_2 \| h_3 \| h_4)$, signature verification is not performed based on $H(h_1 \| h_2 \| h_3)$ and $h_4$.

The RSA accumulator is introduced in this part of the process. If $g^{h1*h2*h3*h4}$ mod N is substituted for $H(h_1 \| h_2 \| h_3 \| h_4)$, the signature is $G=\text{Sign}(g^{h1*h2*h3*h4} \text{ mod } N)$. In accordance with the pseudo-commutative property of the RSA accumulator, $(g^{h1*h2*h3} \text{ mod } N)^{h4}$ mod $N = g^{h1*h2*h3*h4}$ mod N. This means that the signature verification Verify $(\sigma, g^{h1*h2*h3*h4} \text{ mod } N)$ may be performed based on $(g^{h1*h2*h3} \text{ mod } N)$ and $h_4$.

Introduction of the Deletion Signature

A mere replacement of the aggregation of the hash values with the RSA accumulator does not lead to a reduction in the amount of information. The deletion signature is also introduced in order to reduce the amount of information. In order to discriminate signatures, let $s=\text{Sign}(g^{h1*h2*h3*h4} \text{ mod } N)$ represent a signature to the RSA accumulator. Moreover, a signature for deletion is represented by t and the signatures s and t are represented by signature σ=(s,t).

FIGS. 18A and 18B illustrates the concept of the digital signature based on the first underlying technique.

Referring to FIG. 18A, the signer produces the ID tagged document segments $M_1$-$M_4$ and the individual hash values $h_1$-$h_4$ in the same manner as described in the sanitization signature illustrated in FIG. 12A. The hash values $h_1$-$h_4$ are aggregated using the RSA accumulator and $s=\text{Sign}$ $(g^{h1*h2*h3*h4} \text{ mod } N)$ is calculated. Next, t=g is set as an initial value of the deletion signature, and the signature σ=(s, t) is then output.

As illustrated in FIG. 18B, an extractor calculates the hash values $h_1$, $h_3$, and $h_4$ of the ID tagged document segments $M_1$, $M_3$, and $M_4$ to be deleted (not to be extracted) in the similar manner as illustrated in FIG. 12B. The deletion signature t is updated to $t'=g^{h1*h3*h4}$ mod N, and σ=(s,t') is publicly disclosed together with the ID tagged document segment $M_2$.

A verifier calculates the hash value $h_2$ from the disclosed $M_2$. In accordance with σ'=(s,t') and $h_2$, and
Verify(s,$t'^{h2}$ mod N)=Verify (s,$g^{h1*h2*h3*h4}$ mod N),
the verifier performs the verification process.

An aggregation of the deletion signature based on the RSA accumulator substantially reduces the storage amount of the hash values in the sanitization signature, which has been a problem characteristic of the sanitization signature. Here, Sign and Verify may use any signing algorithm.

The first underlying technique has the two signatures (s,t) as described above. The signature t is initialized using a random value (t=$g^r$). The signature s is obtained by raising the initial value of the signature t to the power of each of the hash values of the document segments as an exponent and by applying a typical digital signature to the raised value (s=Sig $(t^{\Pi hi})$). In order to delete a document segment, the signature t is raised to the power of a document segment hash value $(t \to t^{hi})$, and a document to be deleted is erased (mi→x). In order to sanitize a document segment, the document segment is replaced with the hash value thereof (mi→hi and hi=H (mi)).

Figure 19:
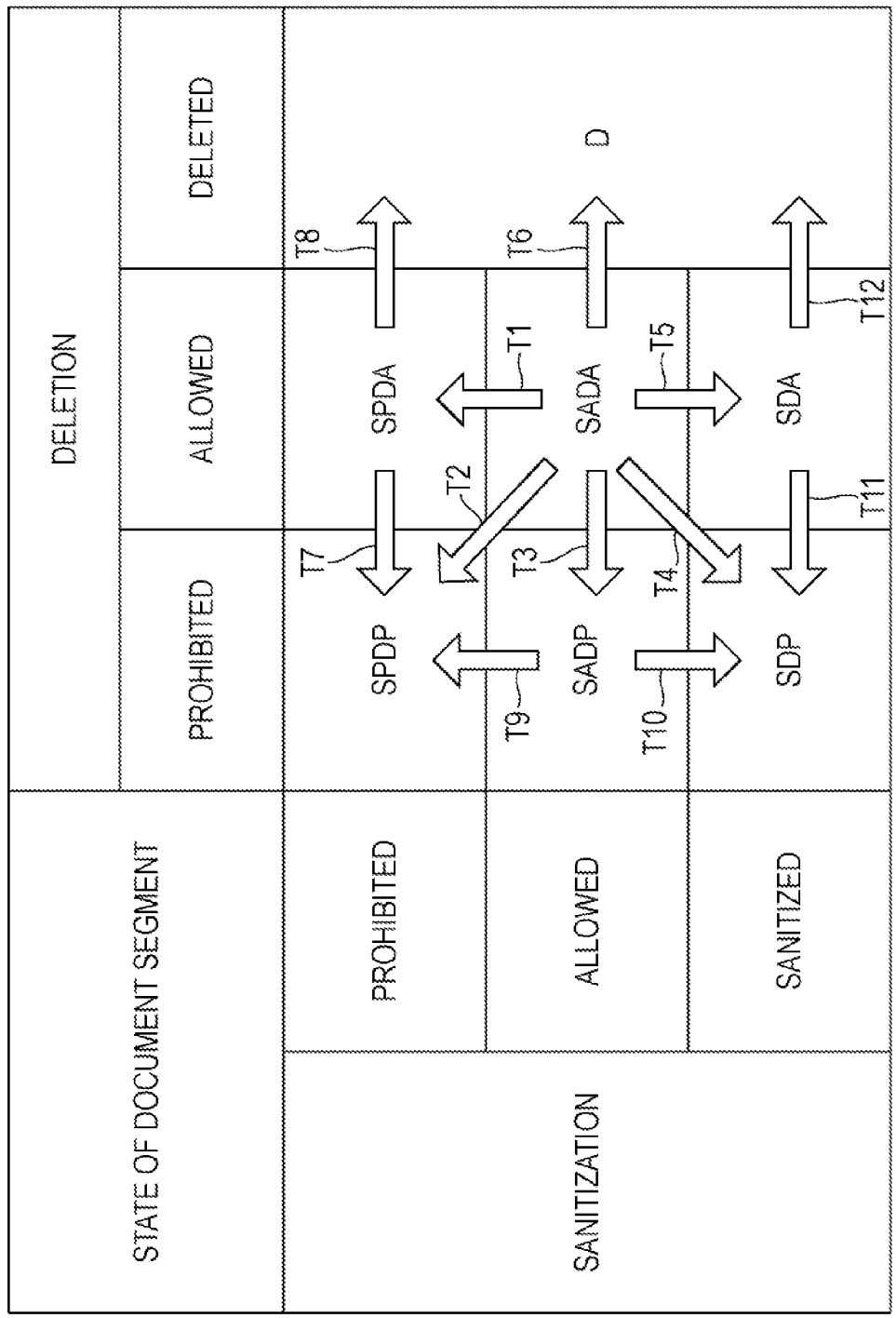
FIG. 19 illustrates the states of document segments and the state transitions of the document segments in accordance with a second underlying signature method.

The first underlying technique may only implement three states of SADA, SDA, and D, and three state transitions of T5, T6, and T12 of a chart 600 illustrated in FIG. 19.

Second Underlying Technique

The inventors of this invention have proposed a second underlying technique.

Each element forming the electronic document M takes one of the states identified by a combination of the element, and a first digital signature and a second digital signature, determined by the element. More specifically, the element takes one of the following states: a sanitization (hiding) allowed and deletion allowed state, a sanitization prohibited and deletion allowed state, a sanitization prohibited and deletion prohibited state, a sanitization allowed and deletion prohibited state, a sanitized (hidden) and deletion prohibited state, a sanitized and deletion allowed state, and a deleted state.

If one element is in a sanitization allowed and deletion allowed state, a reviser may hide or delete the element freely. The sanitization refers to performing a hiding process so that a viewer may not recognize an element. The deletion refers to putting an element into a state from which a viewer may not learn the presence of the element.

An electronic document management apparatus based on the second underlying technique stores an electronic document M with the authenticity of the electronic document M kept verifiable and revises each element forming the electronic document M to be set in a sanitization prohibited and deletion allowed state. The element in a sanitization prohibited and deletion allowed state may be set to one of a sanitization prohibited and deletion prohibited state and a deleted state.

The state of each document segment forming the electronic document M and the state transition are described below. FIG. 19 illustrates the document segment states and the state transitions. The document segment corresponds to the element forming the electronic document M.

As illustrated in FIG. 19, the chart 600 illustrates the state of each document segment settable on each document segment forming the electronic document M. A sanitization allowed and deletion allowed state is represented by "SADA," a sanitization prohibited and deletion allowed state is represented by "SPDA," a sanitization prohibited and deletion prohibited state is represented by "SPDP," a sanitization allowed and deletion prohibited state is represented by "SADP," a sanitized and deletion allowed state is represented by "SDA," a sanitized and deletion prohibited state is represented by "SDP," and a deleted state is represented by "D."

The chart 600 illustrates twelve state transitions T1-T12 as the state transitions of the states. The state transitions T1-T12 represent the transitions through which the reviser may change each document segment from one state to another state to revise the document segment.

The state transition T1 is now considered. The state transition T1 represents a transition from the SADA state, namely, the sanitization allowed and deletion allowed state, to the SPDA state, namely, the sanitization prohibited and deletion allowed state. For example, the state transition T7 represents a transition from the SPDA state, namely, the sanitization prohibited and deletion allowed state to the SPDP, namely, the sanitization prohibited and deletion prohibited state.

In accordance with the second underlying document, the electronic document M includes a plurality of elements (document segments). The first digital signature and the second digital signature, unique to each element, are defined. An electronic document related to an aggregate signature, which is a collection of the first digital signatures, is acquired. A designation of an element as a sanitization prohibition target, out of the electronic document, is accepted. If the element designated as the sanitization prohibition target, and the first digital signature and the second digital signature, defined by the element, are present, it is determined whether or not the element is in the sanitization allowed and deletion allowed state. If the element is in the sanitization allowed and deletion allowed state, the second digital signature defined by the element as the sanitization prohibition target is deleted (in the state transition from SADA→SPDA in FIG. 19).

A designation of an element as a deletion prohibition target, out of the electronic document, is received. If the element designated as the deletion prohibition target, and the first digital signature defined by the element, are present, it is determined that the element is in the deletion allowed state. If the element is determined as being in the deletion allowed state, the first digital signature defined by the element as the deletion prohibited target is deleted (in the state transition from SPDA→SPDP in FIG. 19).

A designation of an element as a deletion target, out of the electronic document, is received. If the element designated as the deletion target, and the first digital signature defined by the element, are present, it is determined that the element is in the deletion allowed state. If the element is determined as being in a deletion allowed state, the first digital signature defined by the element as the deletion target is deleted from the aggregate digital signature (in the state transition from SPDA→D in FIG. 19).

In accordance with the second underlying technique, the element forming the electronic document is transitioned from the sanitization allowed and deletion allowed state to the sanitization prohibited and deletion allowed state. Moreover, the element in the sanitization prohibited and deletion allowed state is set to be in the sanitization prohibited and deletion prohibited state or the deleted state.

Figure 20:
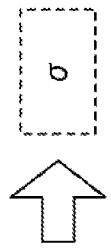
FIG. 20 illustrates a presentation method of the document segment states in accordance with the second underlying signature method.

Similarly, the seven states and the twelve state transitions of the elements illustrated in FIG. 19 are represented by the states of the first digital signature, the second digital signature, and the aggregate digital signature as illustrated in FIG. 20.

In accordance with the second underlying technique, the element revised to be in one of the sanitization prohibited state, the deletion prohibited state, and the deleted state is acquired as a revised document. The authenticity of the revised document is verified depending on the first digital signature, the second digital signature, and the aggregate digital signature, and the verification results are then output. Even if the state of an element designated as a revise target is set to be in one of the sanitization prohibited state, the deletion prohibited state, and the deleted state, the authenticity of the document to be revised containing the revise target is thus verified.

On the other hand, the second underlying technique needs to manage a vast amount of data. If the above-described state management is performed on a document containing 1000 pages on a per page basis, a total of 2002 pieces of digital signature information are stored, e.g., first 1000 partial signatures, second 1000 partial signatures, a first aggregate signature, and a second aggregate signature. If n document segments are handled, 2n+2 pieces of signature information are stored. If a fine control process is intended on the document on a per character basis, the number of document segments becomes several hundred times larger. The amount of signature information is also several hundred times larger. In such a fine control process, an amount of information for each target document segment becomes smaller but an amount of signature information per signature remains unchanged. In the fine control process, the signature information becomes larger in amount than the original document.

In order to overcome the above-described problem, a technique of implementing the seven states and the twelve state transitions with an amount of signature information not proportional to the number of document segments has been implemented in the embodiments to be described below. An electronic document management program, a recording medium storing the program, a electronic document management apparatus, and a electronic document management method are described in detail below with reference to the attached drawings.

Embodiments

System Structure of Electronic Document Management System 100

Figure 1:
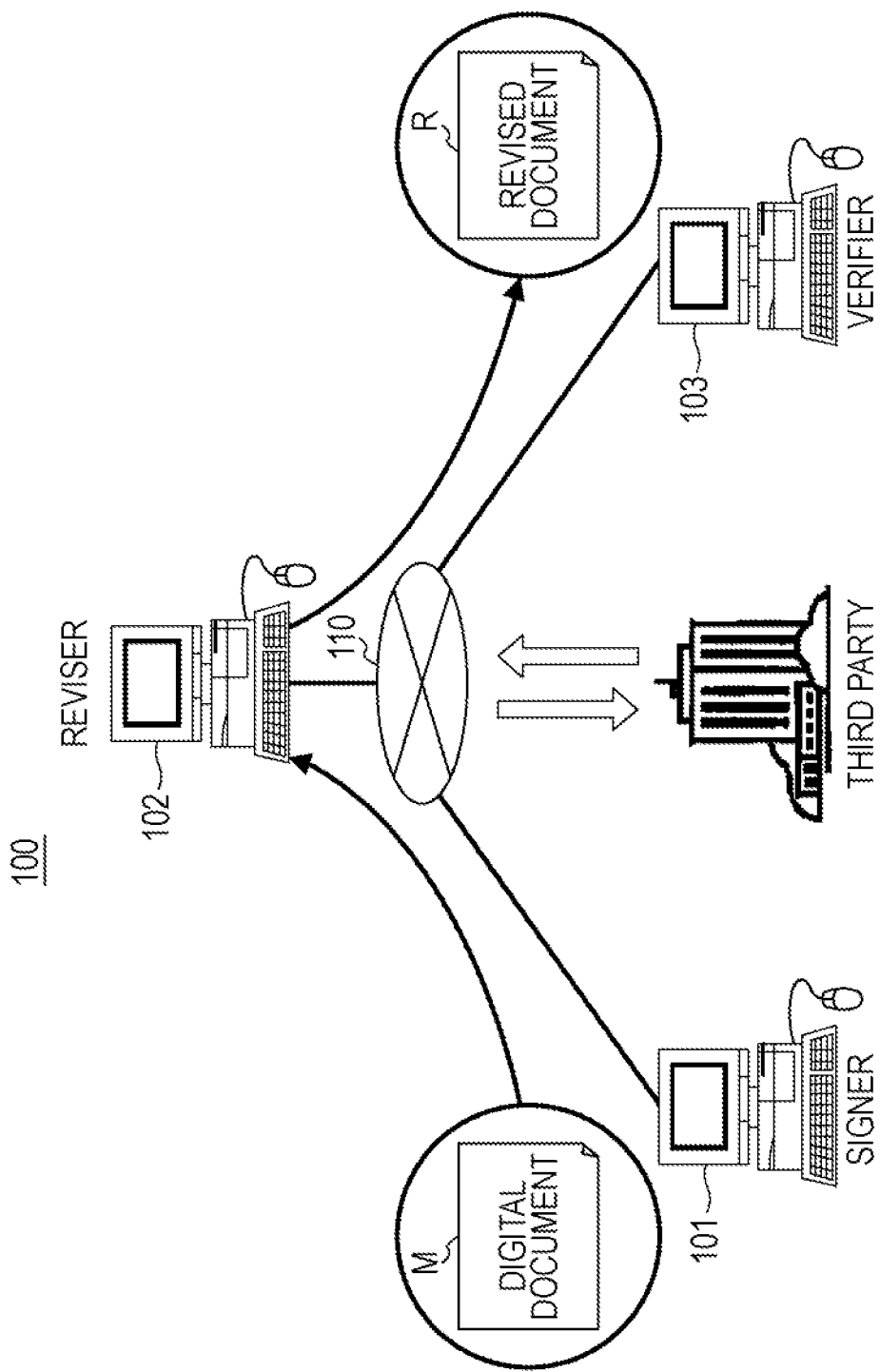
FIG. 1 is a general system diagram of one embodiment.

A system structure of a digital signature apparatus (electronic document management system) 100 of one embodiment is described below. FIG. 1 illustrates the system structure of the electronic document management system 100 of the embodiment.

Referring to FIG. 1, the electronic document management system 100 includes a plurality of electronic document management apparatuses 101, 102, and 103 (three apparatuses in FIG. 1) interconnected to each other in a mutually communicable fashion via a network 110 such as the Internet, a local-area network (LAN), a wide-area network (WAN), or the like.

The electronic document management apparatus 101 is a computer used by a signer who applies a digital signature on an electronic document M. Using the electronic document management apparatus 101, the signer applies on the electronic document M the digital signature for guaranteeing authenticity. More specifically, the electronic document management apparatus 101 attaches to the electronic document M the digital signature produced with a secret key of the signer.

The electronic document M may be information that is preferably confidential, such as a digital family registration issued by an administrative agency, an electronic medical chart issued by a medical institution, a digital grade report issued by an educational institution, or the like. Furthermore, the electronic document M may be a document which a citizen may request a municipality to disclose publicly.

The electronic document management apparatus 102 is a computer used by a reviser who revises the electronic document M that has undergone the digital signing process. Using the electronic document management apparatus 102, the reviser modifies (revises) the state of a document segment forming the electronic document M in order to produce a revised document R. The electronic document management apparatus 102 may then attach to the document segment a revise state indicating how the document segment has been revised.

The electronic document management apparatus 103 is a computer used by a verifier who verifies the authenticity of the revised document R. Using the electronic document management apparatus 103, the reviser verifies the authenticity of the revised document R. The electronic document management apparatus 103 then verifies the authenticity of the revised document R using a public key issued from a third party.

The computers used by the signer, the reviser, and the verifier are respectively the electronic document management apparatuses 101, 102, and 103. However, the embodiment is not limited to this arrangement. Alternatively, the signing, the revising, and the verification may be performed using a single computer (the electronic document management apparatus 101, for example). The revising of the electronic document M may be performed additionally by a plurality of revisers.

The signature, the revising, and the verification of the electronic document M are described in a series of process steps. Using the electronic document management apparatus 101, the signer digitally signs the electronic document M. The electronic document management apparatus 102 performs any revising on the digitally signed electronic document M. In response to a public disclosure from the verifier, the revised document R is transmitted from the electronic document management apparatus 102 to the electronic document management apparatus 103. The electronic document management apparatus 103 verifies the authenticity of the revised document R.

Using the electronic document management apparatus 103, a user may now issue a public disclosure request for an official document related to environmental pollution, for example, to the electronic document management apparatus 102 at a municipality. The user of the electronic document management apparatus 103 may acquire and view the official document related to environmental pollution.

A city official at the municipality may set a variety of attributes on the content of the official document using the electronic document management apparatus 102. For example, the official may set the official document produced and signed by the electronic document management apparatus 101 to be at a compulsory disclosure status because the official document may be related to the present status of air pollution and water pollution, the public disclosure of which is compulsory. The official may black out a portion of the document stating the name of a sufferer actually suffering from the pollution to be in a sanitized state, and may further delete a portion of the document stating the address of the sufferer.

The user of the electronic document management apparatus 102 may set a variety of attributes on any document of the documents to be publicly disclosed. The authenticity of the official document having undergone revising such as the setting of a variety of attributes is verified on the electronic document management apparatus 103. The electronic document management apparatus 103 may verify whether an unauthorized modification has been performed on the document.

Hardware Structure of the Electronic Document Management Apparatus

Figure 2:
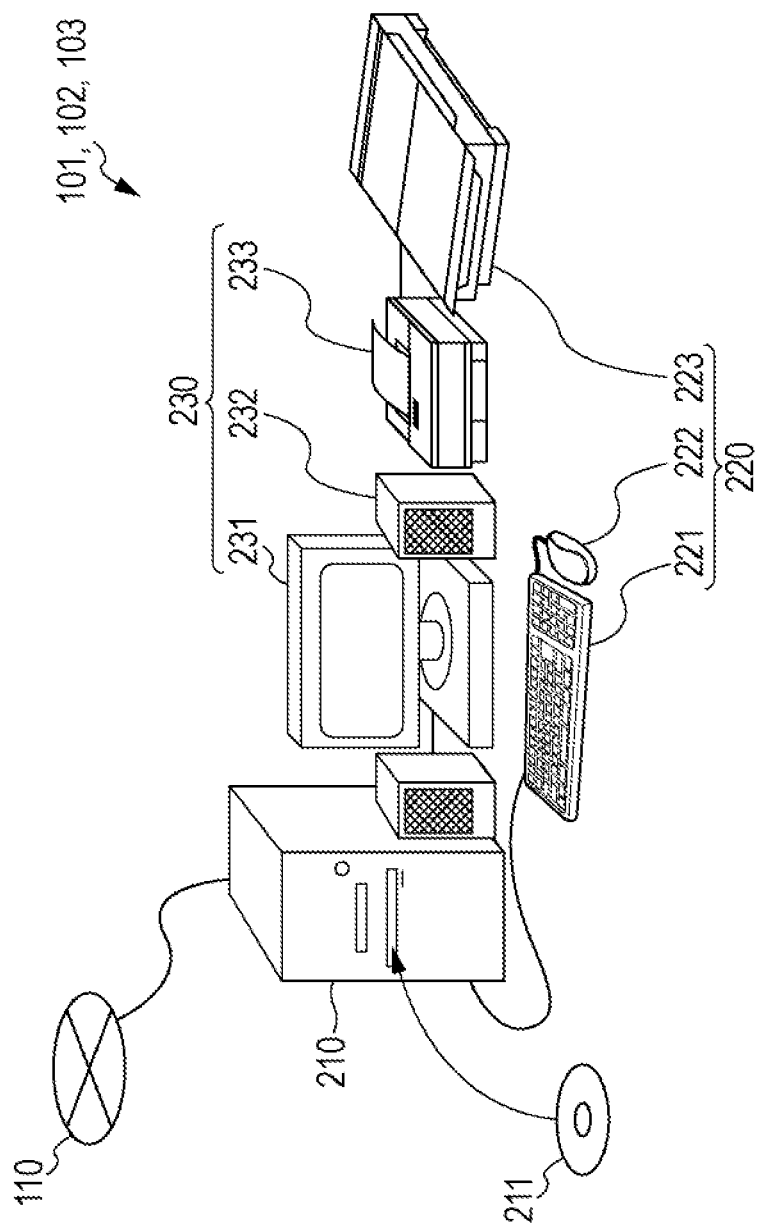
FIG. 2 illustrates a hardware structure of a electronic document management apparatus in accordance with one embodiment.

The hardware structure of each of the electronic document management apparatuses 101, 102, and 103 related to the embodiment is described below. Since these apparatuses are substantially identical in structure to each other, only the electronic document management apparatus 101 is discussed. FIG. 2 illustrates the hardware structure of the electronic document management apparatus 101 of one embodiment of the present invention.

Referring to FIG. 2, the electronic document management apparatus 101 includes a computer 210, input devices 220, and output devices 230. The electronic document management apparatus 101 is connected to a network 110, such as a LAN, WAN, or the Internet, via a router (not shown) or a modem (not shown).

The computer 210 includes a central processing unit (CPU), a memory, and an interface. The CPU generally controls the electronic document management apparatus 101. The memory includes a read-only memory (ROM), a random-access memory (RAM), a hard disk (HD), an optical disk 211, and part or whole of a flash memory. The memory also serves as a working area of the CPU.

Various programs are stored on the memory and are loaded in response to an instruction from the CPU. A disk drive controls the HD and the optical disk 211 in data reading and data writing. An optical disk 211 and the flash memory are removably mounted on the computer 210. The interface controls the inputting from the input device 220, the outputting to the output device 230, and the communication with the network 110.

The input devices 220 include a keyboard 221, a mouse 222, and a scanner 223. The keyboard 221 includes keys used to input characters, numbers, and a variety of instructions and inputs data to the computer 210. The keyboard 221 may be a touch panel type. The mouse 222 is used to move a cursor, to select a range of the cursor, to move a window, and to modify the size of the window, for example. The scanner 223 is used to optically read an image. A read image is captured as image data, and then stored on the memory in the computer 210. The scanner 223 may have a function of an optical character reading (OCR) function.

The output devices 230 may include a display 231, a loudspeaker 232, and a printer 233. The display 231 displays a cursor, icons, and a tool box, etc. The display 231 also displays data such as a document, an image, and function information. The loudspeaker 232 emits a sound effect, text-to-speech voices, etc. The printer 233 prints out image data, document data, etc.

Electronic Document Management Apparatus 101 of the Signer

Figure 3:
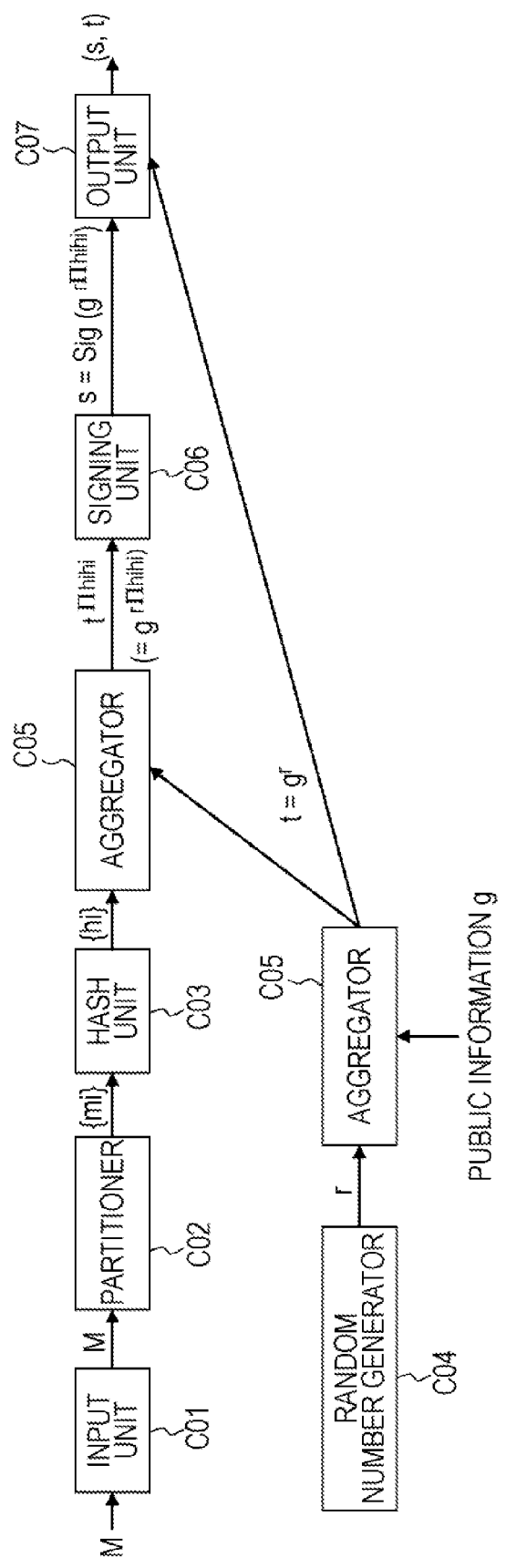
FIG. 3 is a functional block diagram of a electronic document management apparatus (digital signature apparatus) performing a signing process.

The functional blocks of the electronic document management apparatus 101 of the signer related to the embodiment are described below. FIG. 3 is a block diagram illustrating a functional structure of the electronic document management apparatus 101 of the embodiment of the present invention. As illustrated in FIG. 3, the electronic document management apparatus 101 includes an input unit C01, a partitioner C02, a hash unit C03, a random number generator C04, an aggregator C05, a signing unit C06, and an output unit C07 including a transmitter. Each of these elements shares or exclusively uses the memory as a storage element in the computer as necessary.

The functions of the elements C01-C07 are performed by the CPU when the CPU executes programs of the functions stored on a storage area of the memory. Output data from the elements C01-C07 may be stored on the storage area provided by the memory. A functional structure of a connection destination element of each arrow-headed line originated from a source element as illustrated in FIG. 3 is executed by the CPU. The CPU reads the output data of the source element from the storage area and executes the program of the function of the destination element.

The input unit C01 receives an input electronic document M. The partitioner C02 partitions the electronic document M into a plurality of document segments (mi). The hash unit C03 calculates the hash value (hi) unique to each document segment using the hash function (hi=H(mi)). The random number generator C04 generates a random number r. The aggregator C05 calculates one signature ($t=g^r$) using the public information g. The aggregator C05 calculates an aggregation value ($t^{\Pi hihi} = g^{r\Pi hihi}$) based on the hash values of all the document segments, the random number r, and a signature t. The signing unit C06 applies a digital signature on the aggregation value using a secret key SK ($s=Sig(g^{r\Pi hihi})$). Finally, the output unit C07 outputs the signature (s,t).

The electronic document M is a general term of a document handled by the computer, and is digital data produced using a document production application. The digital signature is signature information that is attached to the electronic document in order to verify the authenticity of the electronic document. In other words, like a physical signature such as a seal, the digital signature guarantees an authorized producer of the corresponding electronic document and the authenticity of the electronic document (the electronic document is free from any alteration). Any user may verify the authenticity of the digital signature based on the principle of the public key cryptography method.

Each document segment of the electronic document is in a variety of states identified by the signature t and the state of the document segment. More specifically, the document segment has one of the following states: a sanitization allowed and deletion allowed state, a sanitization prohibited and deletion allowed state, a sanitization prohibited and deletion prohibited state, a sanitization allowed and deletion prohibited state, a sanitized and deletion prohibited state, a sanitized and deletion allowed state, a deleted state.

If a given element is in the sanitization allowed and deletion allowed state, the reviser may sanitize or delete that element freely. Sanitization refers to performing a hiding process so that a viewer may not recognize the element. Deletion refers to putting the element into a state from which a viewer may not learn the presence of the element.

The document segments, when processed by the electronic document management apparatus 101, are in the sanitization allowed and deletion allowed state. The electronic document M may be produced on the electronic document management apparatus 101 or any other computer. If the electronic document M is produced on another computer, the input unit C01 receives the electronic document M from the other computer via the network 110 such as the Internet.

Electronic Document Management Apparatus 102 of the Reviser

Figure 4:
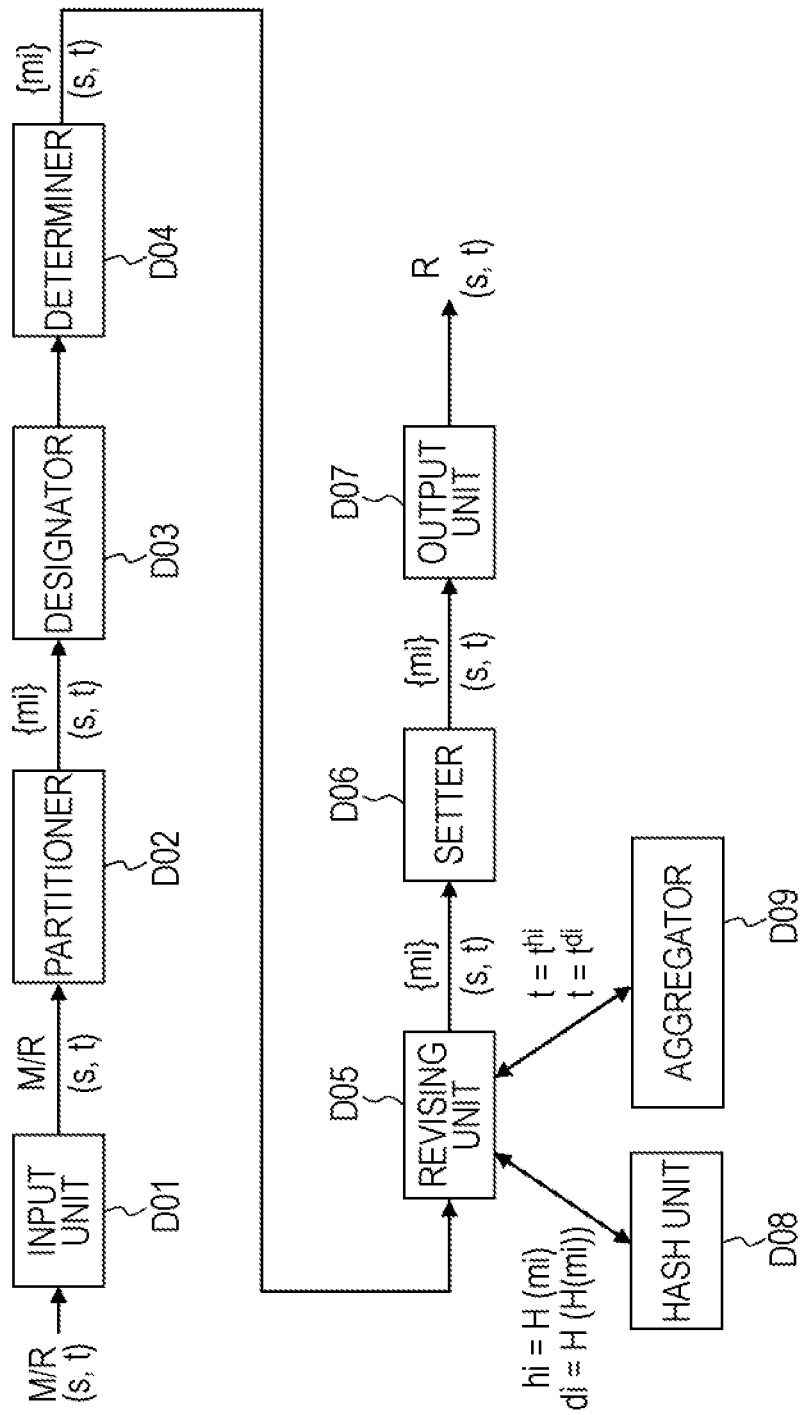
FIG. 4 is a functional block diagram of a electronic document management apparatus (digital signature apparatus) performing a revising process.

The electronic document management apparatus 102 of the reviser in accordance with the embodiment is described below. FIG. 4 is a functional block diagram of the electronic document management apparatus 102. As illustrated in FIG. 4, the electronic document management apparatus 102 includes an input unit D01 including a receiver, a partitioner D02, a designator D03, a determiner D04, a revising unit D05, a setter D06, an output unit D07 including a transmitter, a hash unit D08, and an aggregator D09.

The functions of the elements D01-D09 are performed by the CPU when the CPU executes programs of the functions stored on a storage area. Output data from the elements D01-D09 may be stored on the storage area provided by the memory. A functional structure of a connection destination element of each arrow originating from a source element as illustrated in FIG. 4 is executed by the CPU. The CPU reads the output data of the source element from the storage area and executes the program of the function of the destination element.

The input unit D01 receives the electronic document M and the signature (s,t), signed by the electronic document management apparatus 101, and the partitioner D02 partitions the electronic document M into a plurality of document segments (mi). The designator D03 receives the designation of an element serving as a sanitization prohibition target, from among the document segments mi received by the input unit D01 and partitioned by the partitioner D02. More specifically, the reviser operates the input device 220, such as the keyboard 221 and the mouse 222, illustrated in FIG. 2, thereby receiving the designation of the element serving as the sanitization prohibition target.

The determiner D04 determines from the state of the document segment designated as the sanitization prohibition target by the designator D03 illustrated in FIG. 19 whether the document segment is sanitization allowed or prohibited or deletion allowed or prohibited. For this determination, the determiner D04 may have separate information indicating the state of the document segment, or the determiner D04 may perform this determination through a signature verification function for the document segment.

If the determiner D04 determines that the document segment is in the sanitization allowed and deletion allowed state, the revising unit D05 calculates the hash value (hi=H(mi)) related to the document segment serving as the sanitization prohibition target using the hash unit D08. The revising unit D05 then raises the signature t input to the input unit D01 to the power of the hash value in an aggregation operation using the aggregator D09 ($t=t^{hi}$).

The setter D06 sets the document segment serving as the sanitization prohibition target from the sanitization allowed and deletion allowed state to the sanitization prohibited and deletion allowed state in response to the revising result by the revising unit D05. More specifically, if the signature t is revised with information of the document segment serving as the sanitization prohibition target in the sanitization allowed and deletion allowed state, the setter D06 sets that document segment to be in the sanitization prohibited and deletion allowed state. The element in the sanitization allowed and deletion allowed state, designated as the sanitization prohibition target, thus shifts to the sanitization prohibited and deletion allowed state, in which the element may be deleted but may not be sanitized.

The designator D03 may receive a designation of the document segment becoming a deletion prohibition target from among the document segments mi.

If the determiner D04 determines that the document segment is in the deletion allowed state, the revising unit D05 calculates the hash value of the document segment becoming a deletion prohibition target (di=H(H(mi))) using the hash unit D08 twice. The revising unit D05 raises the signature t input to the input unit D01 to the power of the hash value using the aggregator D09 ($t=t^6$). As a result, the document segment in the deletion allowed state designated to be the deletion prohibition target is shifted to a deletion prohibited state.

If the determiner D04 determines that the document segment is in the deletion allowed and sanitization allowed state, the revising unit D05 calculates the hash value of the document segment serving as the deletion target (hi=H(mi)) using the hash unit D08. The revising unit D05 thus twice raises the signature t input to the input unit D01 to the power of the hash value ($t=t^{hihi}$) using the aggregator D09.

If the determiner D04 determines that the document segment is in the sanitization prohibited and deletion allowed state, the revising unit D05 calculates the hash value of the document segment serving as the deletion target (hi=H(mi)) using the hash unit D08. The revising unit D05 raises once the signature t input to the input unit D01 to the power of the hash value ($t=t^{hi}$) using the aggregator D09.

If the determiner D04 determines that the document segment is in the sanitized and deletion allowed state, the document segment serving as the deletion target is already the hash value (hi=H(mi)). The revising unit D05 then twice raises the signature t input to the input unit D01 to the power of the hash value ($t=t^{hihi}$) using the aggregator D09.

As a deletion result by the revising unit D05, the setter D06 thus shifts the document segment serving as the deletion target from the deletion allowed state to the deleted state, and then deletes the document segment mi. As a result, the document segment in the deletion allowed state designated as the deletion target is deleted from the electronic document M and is thus in the deleted state.

The designation of the document segment serving as the sanitization prohibition target, and the designation of the document segment serving as the deletion prohibition target or the deletion target may be performed on different electronic document management apparatuses 102. More specifically, one electronic document management apparatus 102 designates the document segment in the sanitization allowed and deletion allowed state to be a sanitization prohibition target, and the other electronic document management apparatus 102 designates the document segment in the deletion allowed state to be a deletion prohibition target or a deletion target.

The output unit D07 outputs the electronic document M revised and set by the setter D06 (the revised document R to be discussed later), and the signature (s,t). The output format of the output unit D07 may be any one of the formats of an external computer (such as one of the electronic document management apparatuses 102 and 103), a printout format of the printer 233, and/or a data output format to the memory (for storage).

The input unit D01 receives the document R revised in any of the sanitization prohibited state, the deletion prohibited state, and the deleted state. More specifically, the input unit D01 acquires the revised document R in which the state of the element is set by the setter D06. The document R is digital data that results from revising the element forming the electronic document M. For example, the state of the element designated as the sanitization prohibition target is shifted from the sanitization allowed and deletion allowed state to the sanitization prohibited and deletion allowed state in the revised document R.

If a verifier issues a disclosure request for the revised document R to a reviser, the revised document R is transmitted (output) from the electronic document management apparatus 102 of the reviser to the electronic document management apparatus 103 of the verifier. The input unit E01 of the electronic document management apparatus 103 of the verifier acquires the revised document R transmitted from the electronic document management apparatus 102 of the reviser.

Electronic Document Management Apparatus 103 of the Verifier

Figure 5:
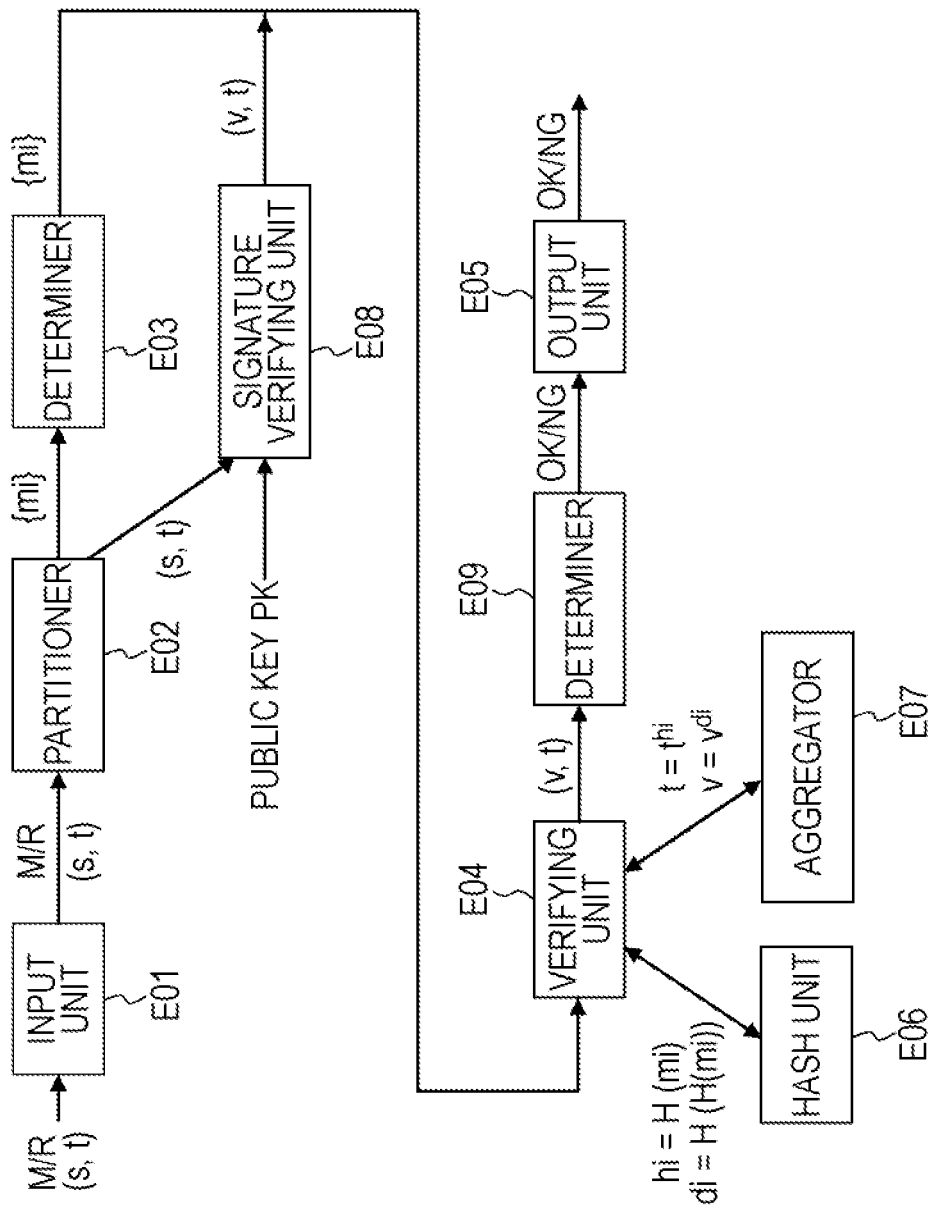
FIG. 5 is a functional block diagram of a electronic document management apparatus (digital signature apparatus) performing a verification process.

The functional structure of the electronic document management apparatus 103 of the embodiment is described below. FIG. 5 is a functional block diagram of the electronic document management apparatus 103. As illustrated in FIG. 5, the electronic document management apparatus 103 includes an input unit E01 including a receiver, a partitioner E02, a determiner E03, a verifying unit E04, an output unit E05, a hash unit E06, an aggregator E07, a signature verifying unit E08, and a determiner E09.

The functions of the elements E01-E09 are performed by the CPU when the CPU executes programs of the functions stored on a storage area. Output data from the elements E01-E09 may be stored on the storage area provided by the memory. A functional structure of a connection destination element of each arrow originating from a source element as illustrated in FIG. 5 is executed by the CPU. The CPU reads the output data of the source element from the storage area and executes the program of the function of the destination element.

The input unit E01 receives the electronic document M, the revised document R, and the signature (s,t), signed by the electronic document management apparatuses 101 and 102. The partitioner E02 partitions the electronic document M into a plurality of document segments (mi). The signature verifying unit E08 performs a signature verification process with the signature s and the public key PK, thereby calculating $v=\text{Verify}(s)=g^{rT\prod hihi}$.

The determiner E03 determines from the state of each document segment whether the document segment is sanitization prohibited or allowed or deletion allowed or prohibited. For this determination, the determiner E03 may have separate information indicating the state of the document segment, or the determiner E03 may perform this determination through a signature verification function for the document segment.

If the determiner E03 determines that the document segment is in the sanitization allowed and deletion allowed state, the verifying unit E04 calculates the hash value (hi=H(mi)) related to the document segment serving as a target using the output unit E05. The verifying unit E04 then twice raises the signature t input to the input unit E01 (or revised by the verifying unit E04) to the power of the hash value ($t=t^{hihi}$) using the output unit D07.

If the determiner E03 determines that the document segment is in the sanitization prohibited and deletion allowed state, the verifying unit E04 calculates the hash value of the document segment as the target (hi=H(mi)) using the hash unit E06. The verifying unit E04 then raises the signature t input to the input unit E01 (or revised by the verifying unit E04) to the power of the hash value once ($t=t^{hihi}$) using the output unit D07.

If the determiner E03 determines that a given document segment is in the sanitized and deletion allowed state, the hash value of that document segment has already been replaced with (hi=H(mi)). The verifying unit E04 uses the hash value as is and twice raises the signature t input to the input unit E01 (or revised by the verifying unit E04) to the power of the hash value ($t=t^{hihi}$) using the aggregator E07.

If the determiner E03 determines that the document segment is in the sanitization allowed and deletion prohibited state, the verifying unit E04 calculates two types of hash values (hi=H(mi), and di=H(H(mi))) of the document segment serving as a target using the hash unit E06. The verifying unit E04 twice raises the signature t input to the input unit E01 (or revised by the verifying unit E04) to the power of the hash value ($t=t^{hihi}$) using the aggregator E07. The verifying unit E04 further raises once the value v calculated by the signature verifying unit E08 to the power of the hash value di ($v=v^{di}$) using the aggregator E07.

If the determiner E03 determines that the document segment is in the sanitization prohibited and deletion prohibited state, the verifying unit E04 calculates two types of hash values (hi=H(mi), and di=H(H(mi))) of the document segment serving as a target using the hash unit E06. The verifying unit E04 raises the signature t input to the input unit E01 (or revised by the verifying unit E04) to the power of the hash value once ($t=t^{hi}$) using the aggregator E07. Furthermore, the verifying unit E04 raises the value v calculated by the signature verifying unit E08 to the power of the hash value di once ($v=v^{di}$) using the aggregator E07.

If the determiner E03 determines that a given document segment is in the sanitized and deletion prohibited state, the target document segment is replaced with the hash value thereof (hi=H(mi)). The verifying unit E04 thus calculates the hash value (di=H(H(mi))) of that hash value using the output unit E05. The verifying unit E04 twice raises the signature t input to the input unit E01 (or revised by the verifying unit E04) to the power of the hash value ($t=t^{hihi}$) using the aggregator E07. Furthermore, the verifying unit E04 raises the value v calculated by the signature verifying unit E08 to the power of the hash value di ($v=v^{di}$) using the aggregator E07.

The determiner E09 compares the two signatures s and t, revised by the verifying unit E04, as will be described later. If the two signature values match, the determiner E09 determines the signatures are correct. If the two signatures are different from each other, the determiner E09 determines that the signatures are in error.

The output unit E05 outputs the determination results of the determiner E09. The output format of the output unit E05 is any one of the formats of an external computer (such as one of the electronic document management apparatuses 102 and 103), a printout format of the printer 233, and a data output format to the memory (for storage).

Algorithm of the Signing Process

An algorithm of the signing process executed by the electronic document management apparatus 101 is described below. FIG. 6 is a flowchart illustrating the algorithm of the signing process executed by the electronic document management apparatus 101 of the embodiment of the present invention.

Referring to FIG. 6, the input unit C01 in the electronic document management apparatus 101 determines whether or not the electronic document M has been received (T1). If not, the input unit C01 waits on standby for the electronic document M. If the electronic document M has been received, the partitioner C02 partitions the electronic document M into document segments (T2). The random number generator C04 generates concurrently a random number r (T3). The aggregator C05 performs an aggregation operation on the public information g, thereby generating the signature t (T4). The signing unit C06 initializes the signature s to be s=t (T5).

The signing unit C06 repeatedly performs the following operation on all the document segments (T6). If no unprocessed document segments remain, the signing unit C06 revises the signature s (T7). The output unit C07 outputs the electronic document M and the signature (s,t) (T8), thereby completing the signing process.

If an unprocessed document segment remains, the signing unit C06 calculates the hash value hi=H(mi) of the selected document segment using the hash unit C03 (T9). Here, H(mi) represents converting the document segment mi with the hash value.

The aggregator C05 calculates $s^{hihi}$ with the signature s and the hash value hi, thereby updating the signature s to $s=s^{hihi}$ (T10).

Finally, the signing unit C06 sets the document segment mi to be in the sanitization allowed and deletion allowed (SADA) state (T11). The above process is repeated on all the document segments.

Upon completing the above-described process on all the document segments, the signing unit C06 generates Sign(s) for the signature s, thereby updating the signature s to Sign(s) (T7). The output unit C07 outputs (transmits) the signature (s,t) (T8).

Algorithm of the Revising Process

An algorithm of the digital signature process performed by the electronic document management apparatus 102 is described below. FIGS. 7A-7H are flowcharts illustrating the algorithm of the digital signature process.

Figure 7A:
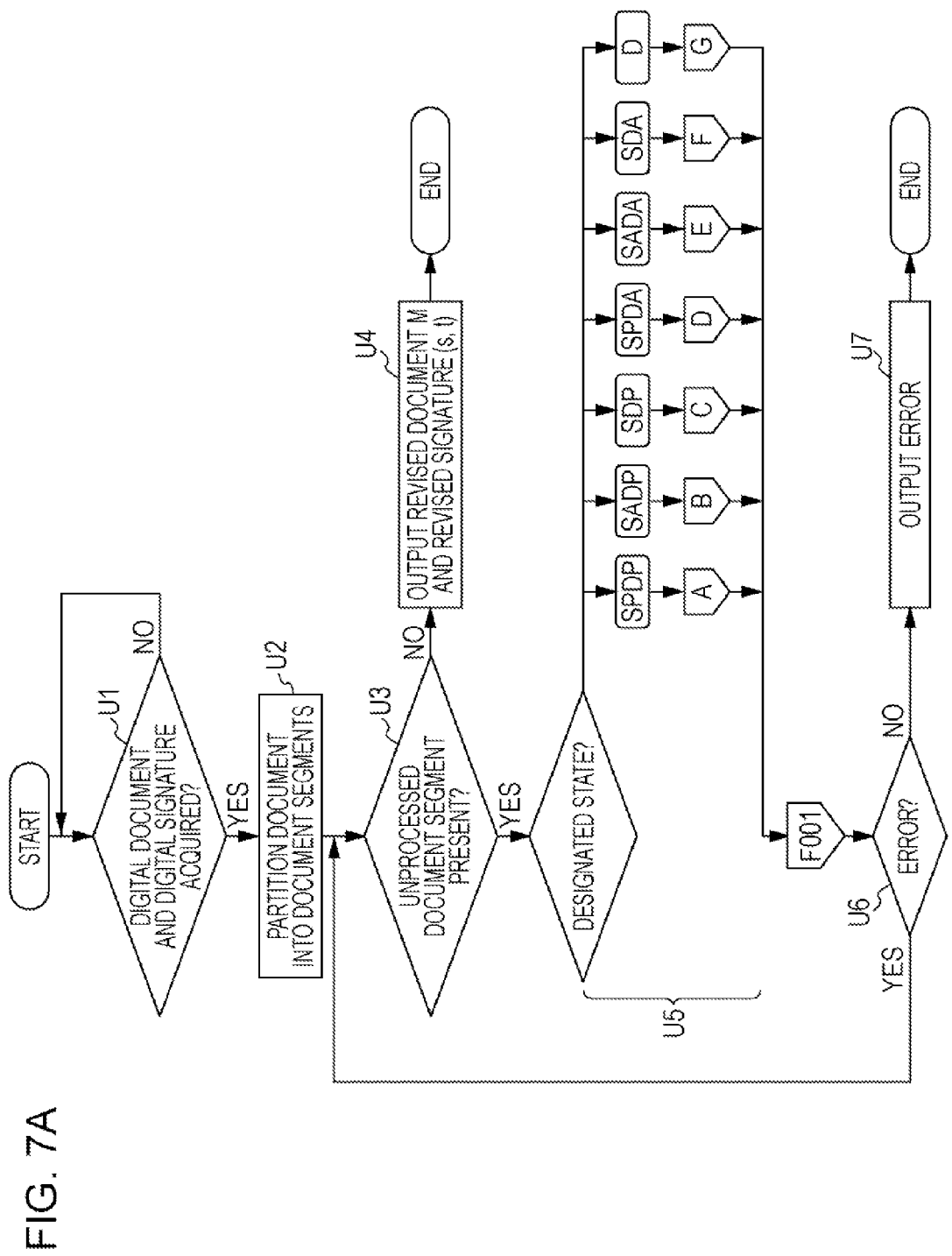
FIG. 7A is a first flowchart illustrating a revising process.

Referring to FIG. 7A, the input unit D01 in the electronic document management apparatus 102 determines whether the signed document M and the signature (s,t) have been received (U1). If not, the input unit D01 waits on standby for the document M and the signature (s,t). If the signed document M and the signature (s,t) have been received, the partitioner D02 partitions the electronic document M into document segments (U2).

The input unit D01 receives not only the electronic document M but also the revised document R. In the case of the signed electronic document M, each document segment is the sanitization allowed and deletion allowed state. In the case of the revised document R, however, each document segment may be at any of the six states including the sanitization prohibited and deletion prohibited state, the sanitization allowed and deletion prohibited state, the sanitized and deletion prohibited state, the sanitization prohibited and deletion allowed state, the sanitization allowed and deletion allowed state, and the sanitized and deletion allowed state. It is noted that there is no document segment in the deleted state because such a document segment is deleted.

The electronic document management apparatus 102 repeats the following process on each of the document segments (U3). If no unprocessed document segment is present, the output unit D07 outputs the revised document R and the revised signature (s,t) (U4), thereby completing the signing process.

In the process repeated for each document segment, the designator D03 receives an instruction of the state revising of each document segment. In response to the designated state, the designator D03 branches to one of subroutines A-G (U5). If an instruction to shift to the sanitization prohibited and deletion prohibited state is issued, the subroutine A is performed. If an instruction to shift to the sanitization allowed and deletion prohibited state is issued, the subroutine B is performed. If an instruction to shift to the sanitized and deletion prohibited state is issued, the subroutine C is performed. If an instruction to shift to the sanitization prohibited and deletion allowed state is issued, the subroutine D is performed. If an instruction to shift to the sanitization allowed and deletion allowed state is issued, the subroutine E is performed. If an instruction to shift to the sanitized and deletion allowed state is issued, the subroutine F is performed. If an instruction to shift to the deleted state, the subroutine G is performed.

If an error is detected subsequent to the branching entry point (F001), the output unit D07 outputs an error (U6 and U7), thereby suspending the process. The above-described process is performed on each of all the document segments. Step U5 is described below.

Subroutine A

The subroutine A is illustrated in FIG. 7B. The determiner D04 checks the state of a current document segment and branches to the appropriate subroutine depending on one of the six states: the sanitization prohibited and deletion prohibited (SPDP) state, the sanitization allowed and deletion prohibited (SADP) state, the sanitized and deletion prohibited (SDP) state, the sanitization prohibited and deletion allowed (SPDA) state, the sanitization allowed and deletion allowed (SADA) state, and the sanitized and deletion allowed (SDA) state.

If the document segment mi is in the sanitization prohibited and deletion prohibited (SPDP) state, no revising is required. The determiner D04 returns to the entry point F001.

If the document segment mi is in the sanitization allowed and deletion prohibited (SADP) state (with $t=t^{di}$), the hash unit D08 converts the document segment mi to the hash value $hi=H(mi)$ (U11). The aggregator D09 then raises the signature t to the power of the hash value hi. The revising unit D05 then revises the signature t to be $t=t^{hi}$ (U12). The setter D06 sets the document segment mi to be in the sanitization prohibited and deletion prohibited (SPDP) state (U13), and the processing returns to step F001.

If the document segment mi is in the sanitized and deletion prohibited (SDP) state, revising to the sanitization prohibited and deletion prohibited (SPDP) state is not permitted. The determiner D04 determines the process step to be in error and returns to entry point F001.

If the document segment mi is in the sanitization prohibited and deletion allowed (SPDA) state, the hash unit D08 converts the document segment mi to a double hash value $di=H(H(mi))$ (U14). The aggregator D09 thus raises the signature t to the power of the hash value di. The revising unit D05 revises the signature t to be $t=t^{di}$ (U15). Finally, the setter D06 sets the document segment mi to be in the sanitization prohibited and deletion prohibited (SPDP) state (U16), and then the processing returns to entry point F001.

If the document segment mi is in the sanitization allowed and deletion allowed (SADA) state, the hash unit D08 converts the document segment mi to the hash value $hi=H(mi)$ and the double hash value $di=H(H(mi))$ (U17). The aggregator D09 raises the signature t to the power of the hash values hi and di. The revising unit D05 revises the signature t to be $t=t^{di hi}$ (U18). Finally, the setter D06 sets the document segment mi to be in the sanitization prohibited and deletion prohibited (SPDP) state (U19). Processing returns to entry point F001.

If the document segment mi is in the sanitized and deletion allowed (SDA) state, revising to the sanitization prohibited and deletion prohibited (SPDP) state is not permitted. The determiner D04 determines the process step to be in error and returns to entry point F001.

Subroutine B

The subroutine B is illustrated in FIG. 7C. If the document segment mi is in the sanitization prohibited and deletion prohibited (SPDP) state, revising to the sanitization allowed and deletion prohibited (SADP) state is not permitted. The determiner D04 determines the process step to be in error and returns to entry point F001.

If the document segment mi is in the sanitization allowed and deletion prohibited (SADP) state, no revising is performed. The determiner D04 directly returns to entry point F001.

If the document segment mi is in the sanitized and deletion prohibited (SDP) state, revising to the sanitization allowed and deletion prohibited (SADP) state is not permitted. The determiner D04 determines the process step to be in error and returns to entry point F001.

If the document segment mi is in the sanitization prohibited and deletion allowed (SPDA) state, revising to the sanitization allowed and deletion prohibited state is not permitted. The determiner D04 determines the process step to be in error and returns to entry point F001.

If the document segment mi is in the sanitization allowed and deletion allowed (SADA) state, the hash unit D08 converts the document segment mi to the double hash value $di=H(H(mi))$ (U21). The aggregator D09 raises the signature t to the power of the hash value di. The revising unit D05 revises the signature t to be $t=t^{di}$ (U22). Finally, the setter D06 sets the document segment mi to be in the sanitization allowed and deletion prohibited (SADP) state (U23). Processing returns to entry point F001.

If the document segment mi is in the sanitized and deletion allowed (SDA) state, revising to the sanitization allowed and deletion prohibited (SADP) state is not permitted. The determiner D04 determines the process step to be in error and returns to entry point F001.

Subroutine C

Figure 7D:
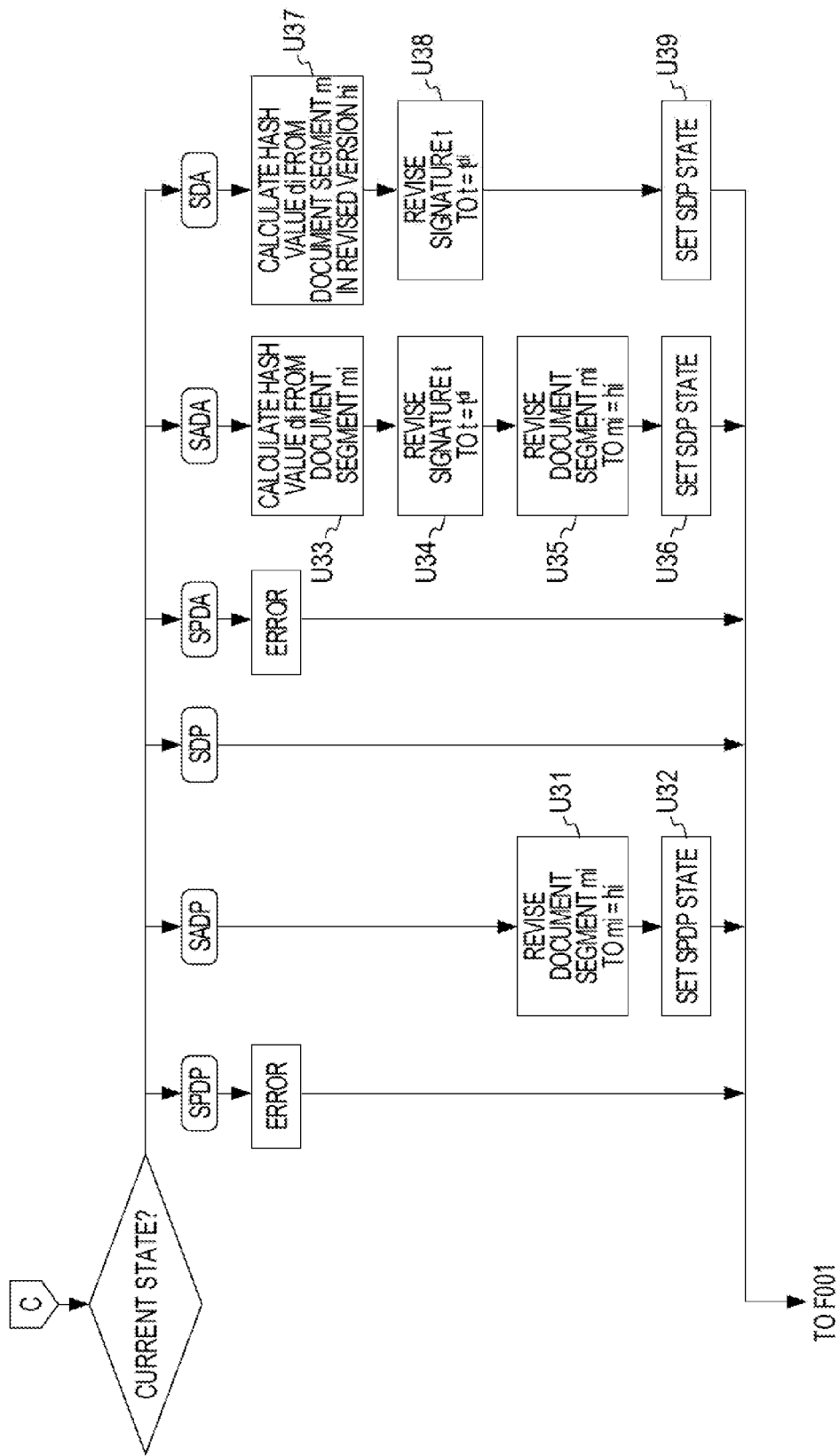
FIG. 7D is a fourth flowchart illustrating the revising process.

The subroutine C is illustrated in FIG. 7D. If the document segment mi is in the sanitization prohibited and deletion prohibited (SPDP) state, revising to the sanitized and deletion prohibited (SDP) state is not permitted. The determiner D04 determines the process step to be in error and returns to entry point F001.

If the document segment mi is in the sanitization allowed and deletion prohibited (SADP) state, the hash unit D08 converts the document segment mi to the hash value $hi=H(mi)$. The revising unit D05 revises the document segment mi to be $mi=hi$ (U31). Finally, the setter D06 sets the document segment mi to be in the sanitized and deletion prohibited (SDP) state (U32). Processing returns to entry point F001.

If the document segment mi is in the sanitized and deletion prohibited (SDP) state, no revising is made. The determiner D04 directly returns to entry point F001.

If the document segment mi is in the sanitization prohibited and deletion allowed (SPDA) state, revising to the sanitized and deletion prohibited (SDP) state is not permitted. The determiner D04 determines the process step to be in error and returns to entry point F001.

If the document segment mi is in the sanitization allowed and deletion allowed (SADA) state, the hash unit D08 converts the document segment mi to the hash value $hi=H(mi)$ and the double hash value $di=H(H(mi))$ (U33). The aggregator D09 raises the signature t to the power of the hash value di in order to revise the signature t to be $t=t^{di}$ (U34). The revising unit D05 revises the document segment mi to be $mi=hi$ (U35).

The setter D06 sets the document segment mi to be in the sanitized and deletion prohibited (SDP) state (U36). Processing proceeds to entry point F001.

If the document segment mi is in the sanitized and deletion allowed (SDA) state, the document segment mi is already mi=hi. The hash unit D08 converts the document segment mi(hi) to the hash value di=H(hi) (U37). The aggregator D09 raises the signature t to the power of the hash value di. The revising unit D05 revises the signature t to be $t=t^{di}$ (U38). Finally, the setter D06 sets the document segment mi to be in the sanitized and deletion prohibited (SDP) state (U39). Processing returns to entry point F001.

Subroutine D

The subroutine D is illustrated in FIG. 7E. If the document segment mi is in the sanitization prohibited and deletion prohibited (SPDP) state, revising to the sanitization prohibited and deletion allowed (SPDA) state is not permitted. The determiner D04 determines the process step to be in error and returns to entry point F001.

If the document segment mi is in the sanitization allowed and deletion prohibited (SADP) state, revising to the sanitization prohibited and deletion allowed (SPDA) state is not permitted. The determiner D04 determines the process step to be in error and returns to entry point F001.

If the document segment mi is in the sanitized and deletion prohibited (SDP) state, revising to the sanitization prohibited and deletion allowed (SPDA) state is not permitted. The determiner D04 determines the process step to be in error and returns to entry point F001.

If the document segment mi is in the sanitization prohibited and deletion allowed (SPDA) state, no revising is made. The determiner D04 directly returns to entry point F001.

If the document segment mi is in the sanitization allowed and deletion allowed (SADA) state, the hash unit D08 converts the document segment mi to the hash value hi=H(mi) (U41). The aggregator D09 raises the signature t to the power of the hash value hi. The revising unit D05 revises the signature t to be $t=t^{hi}$ (U42). Finally, the setter D06 sets the document segment mi to be in the sanitization prohibited and deletion allowed (SPDA) state. Processing returns to entry point F001.

If the document segment mi is in the sanitized and deletion allowed (SDA) state, revising to the sanitization prohibited and deletion allowed (SPDA) state is not permitted. The determiner D04 determines the process step to be in error and returns to entry point F001.

Subroutine E

The subroutine E is illustrated in FIG. 7F. If the document segment mi is in the sanitization prohibited and deletion prohibited (SPDP) state, revising to the sanitization allowed and deletion allowed (SADA) state is not permitted. The determiner D04 determines the process step to be in error and returns to entry point F001.

If the document segment mi is in the sanitization allowed and deletion prohibited (SADP) state, revising to the sanitization allowed and deletion allowed (SADA) state is not permitted. The determiner D04 determines the process step to be in error and returns to entry point F001.

If the document segment mi is in the sanitized and deletion prohibited (SDP) state, revising to the sanitization allowed and deletion allowed (SADA) state is not permitted. The determiner D04 determines the process step to be in error and returns to entry point F001.

If the document segment mi is in the sanitization prohibited and deletion allowed (SPDA) state, revising to the sanitization allowed and deletion allowed (SADA) state is not permitted. The determiner D04 determines the process step to be in error and returns to entry point F001.

If the document segment mi is in the sanitization allowed and deletion allowed (SADA) state, no revising is made. The determiner D04 directly returns to entry point F001.

If the document segment mi is in the sanitized and deletion allowed (SDA) state, revising to the sanitization allowed and deletion allowed (SADA) state is not permitted. The determiner D04 determines the process step to be in error and returns to entry point F001.

Subroutine F

Figure 7G:
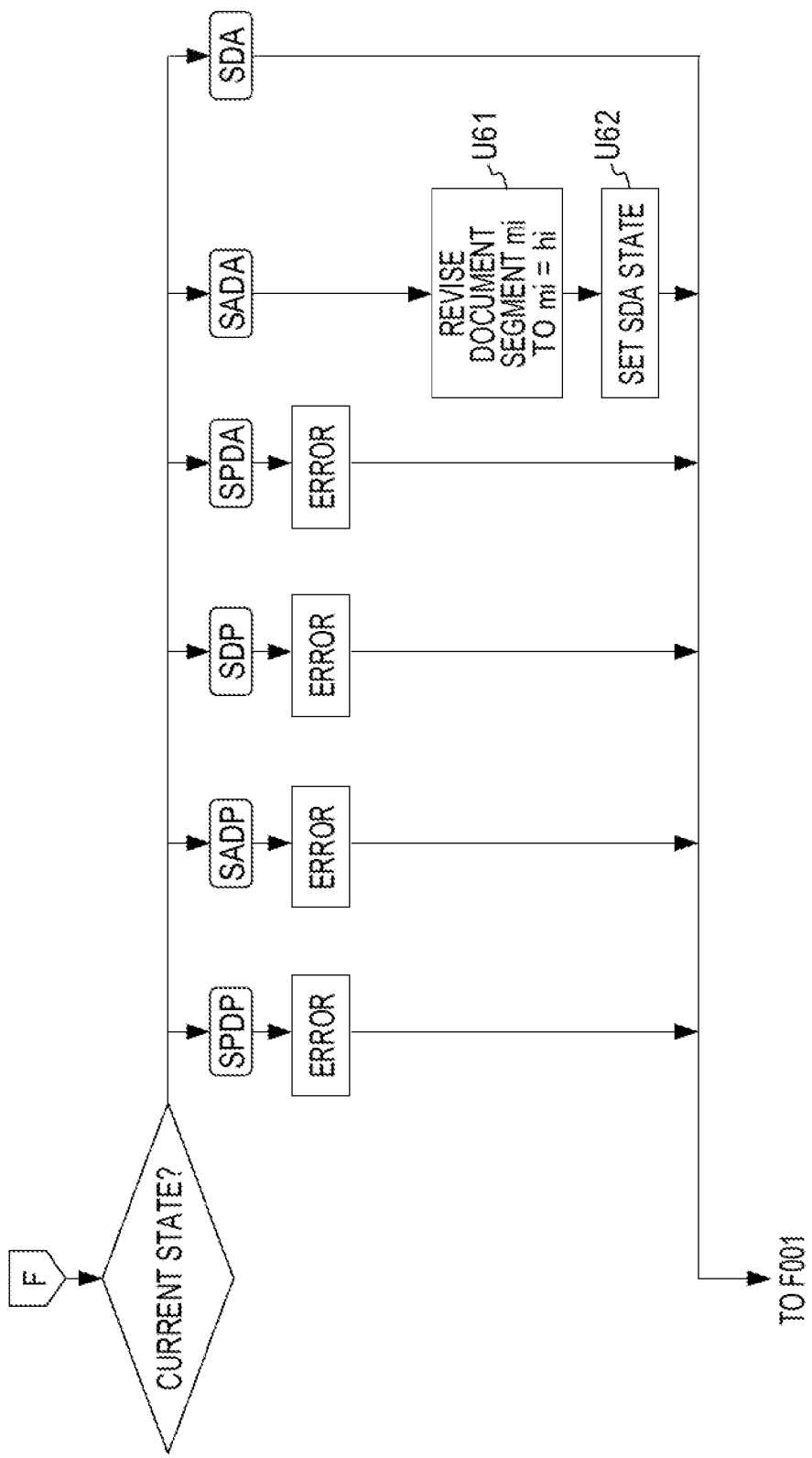
FIG. 7G is a seventh flowchart illustrating the revising process.

The subroutine F is illustrated in FIG. 7G. If the document segment mi is in the sanitization prohibited and deletion prohibited (SPDP) state, revising to the sanitized and deletion allowed (SDA) state is not permitted. The determiner D04 determines the process step to be in error and returns to entry point F001.

If the document segment mi is in the sanitization allowed and deletion prohibited (SADP) state, revising to the sanitized and deletion allowed (SDA) state is not permitted. The determiner D04 determines the process step to be in error and returns to entry point F001.

If the document segment mi is in the sanitized and deletion prohibited (SDP) state, revising to the sanitized and deletion allowed (SDA) state is not permitted. The determiner D04 determines the process step to be in error and returns to entry point F001.

If the document segment mi is in the sanitization prohibited and deletion allowed (SPDA) state, revising to the sanitized and deletion allowed (SDA) state is not permitted. The determiner D04 determines the process step to be in error and returns to entry point F001.

If the document segment mi is in the sanitization allowed and deletion allowed (SADA) state, the hash unit D08 converts the document segment mi to the hash value hi=H(mi). The revising unit D05 revises the document segment mi to be mi=hi (U61). The setter D06 sets the document segment mi to be in the sanitized and deletion allowed (SDA) state (U62). Processing returns to entry point F001.

If the document segment mi is in the sanitized and deletion allowed (SDA) state, no revising is made. The determiner D04 directly returns to entry point F001.

Subroutine G

The subroutine G is illustrated in FIG. 7H. If the document segment mi is in the sanitization prohibited and deletion prohibited (SPDP) state, revising to the deleted state is not permitted. The determiner D04 determines the process step to be in error, and returns to entry point F001.

If the document segment mi is in the sanitization allowed and deletion prohibited (SADP) state, revising to the deleted state is not permitted. The determiner D04 determines the process step to be in error and returns to entry point F001.

If the document segment mi is in the sanitized and deletion prohibited (SDP) state, revising to the deleted state is not permitted. The determiner D04 determines the process step to be in error and returns to entry point F001.

If the document segment mi is in the sanitization prohibited and deletion allowed (SPDA) state, the hash unit D08 converts the document segment mi to the hash value hi=H(mi) (U71). The aggregator D09 raises the signature t to the power of the hash value hi. The revising unit D05 revises the signature t to be $t=t^{hi}$ (U72). The revising unit D05 deletes the document segment mi (U73). Finally, the setter D06 deletes the state (U74). Processing returns to entry point F001.

If the document segment mi is in the sanitization allowed and deletion allowed (SADA) state, the hash unit D08 converts the document segment mi to the hash value hi=H(mi)

(U75). The aggregator D09 twice raises the signature t to the power of the hash value hi. The revising unit D05 revises the signature t to be $t=t^{hihi}$ (U76). The revising unit D05 deletes the document segment mi (U77). The setter D06 deletes the state (U78). Processing returns to entry point F001.

If the document segment mi is in the sanitized and deletion allowed (SDA) state, the document segment is already revised to be mi=hi as illustrated at U79. The aggregator D09 twice raises the signature t to the power of the hash value hi. The revising unit D05 revises the signature t to be $t=t^{hihi}$ (U80). The revising unit D05 also deletes the document segment mi(hi) (U81). Finally, the setter D06 deletes the state (U82). Processing returns to entry point F001.

In the flowchart described here, the designator D03 designates the state subsequent to the transition, and then the determiner D04 determines the current state of the document segment and then processes the document segment. Alternatively, the determiner D04 may perform the process thereof prior to the process of the designator D03. The designator D03 may thus prevent a state causing an error from being selected in view of the state of the document segment.

Algorithm of the Verification Process

Figure 8A:
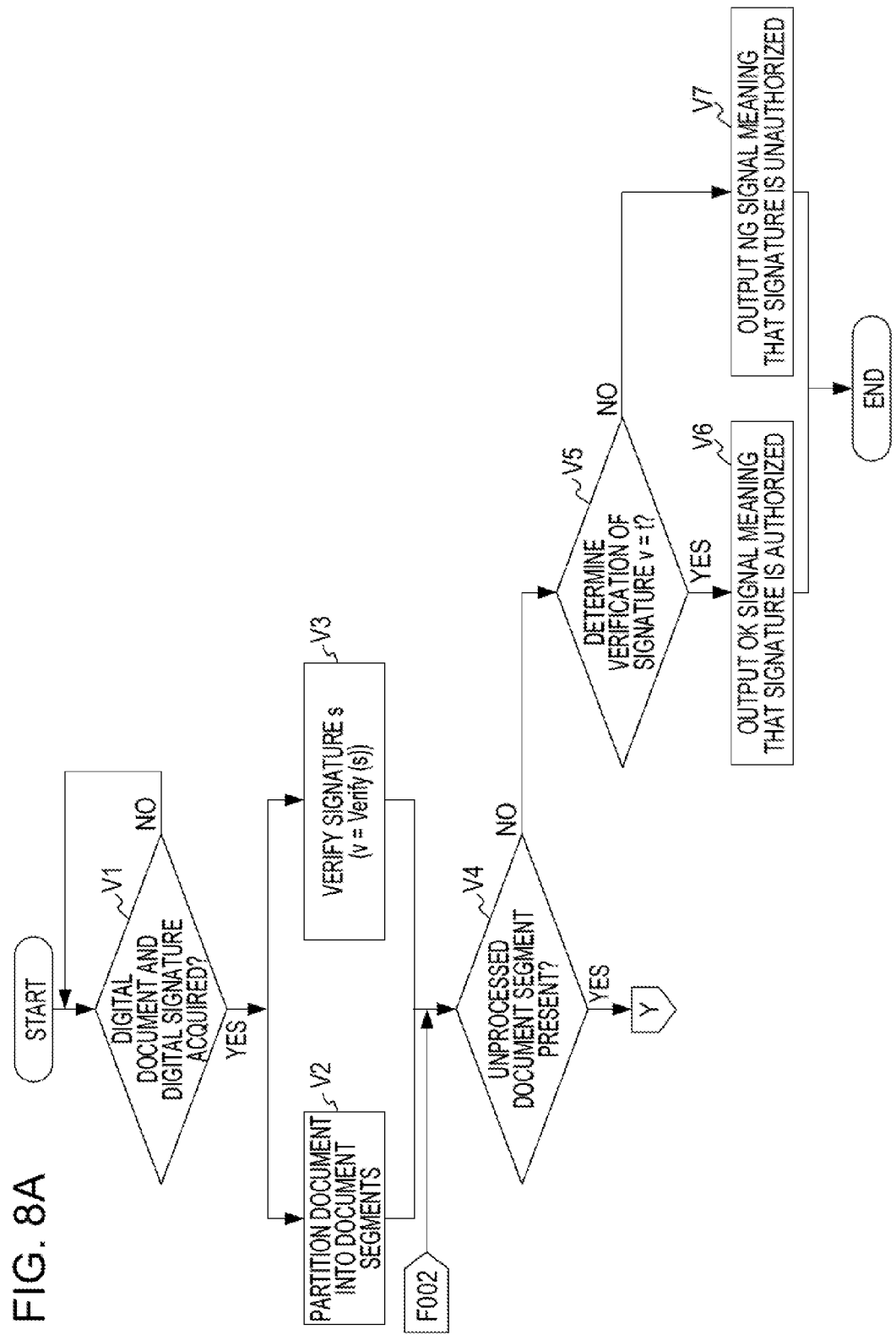
FIG. 8A is a first flowchart illustrating a verification process.
Figure 13A:
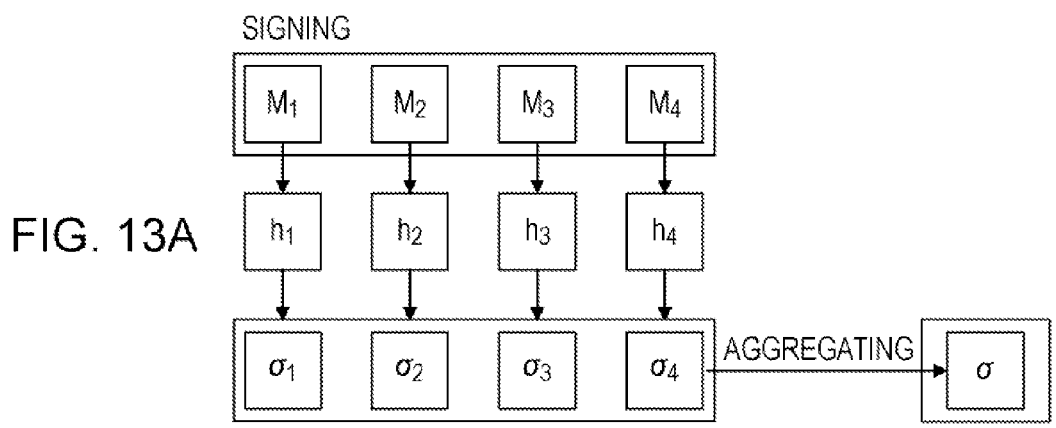
FIG. 13A is a first chart illustrating problems of a deletion signature technique in the related art.
Figure 13B:
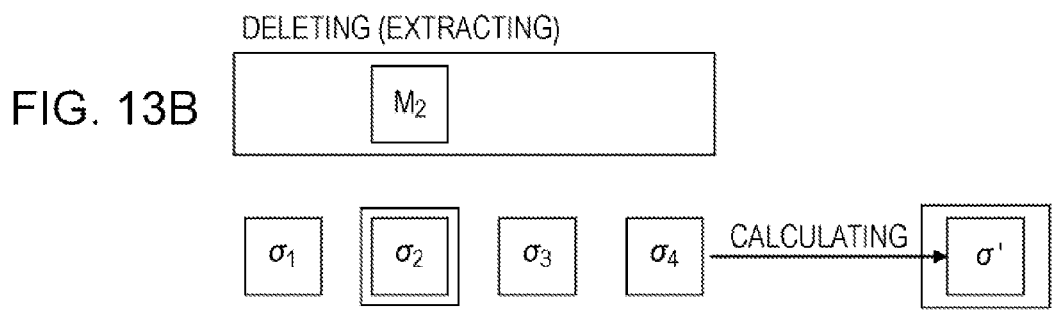
FIG. 13B is a second chart illustrating problems of the deletion signature technique in the related art.
Figure 14:
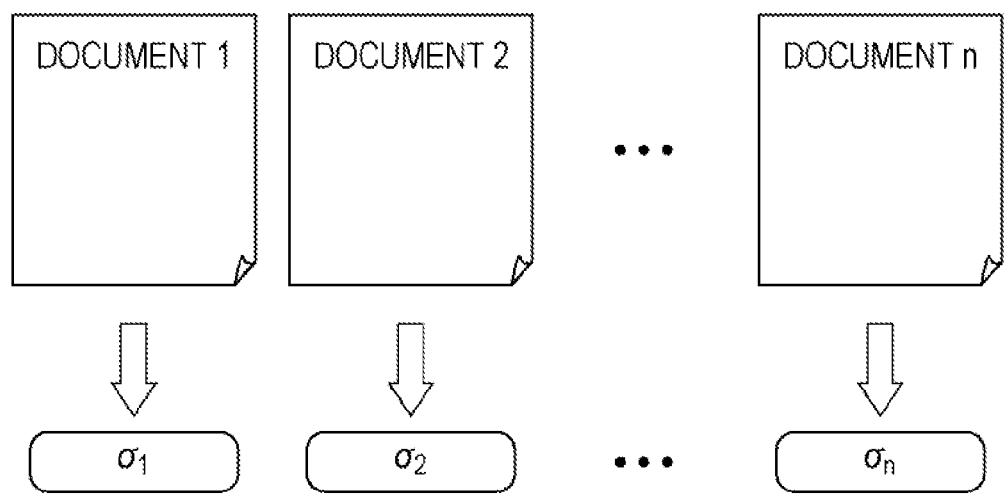
FIG. 14 diagrammatically illustrates the concept of the digital signature of the related art.
Figure 15:
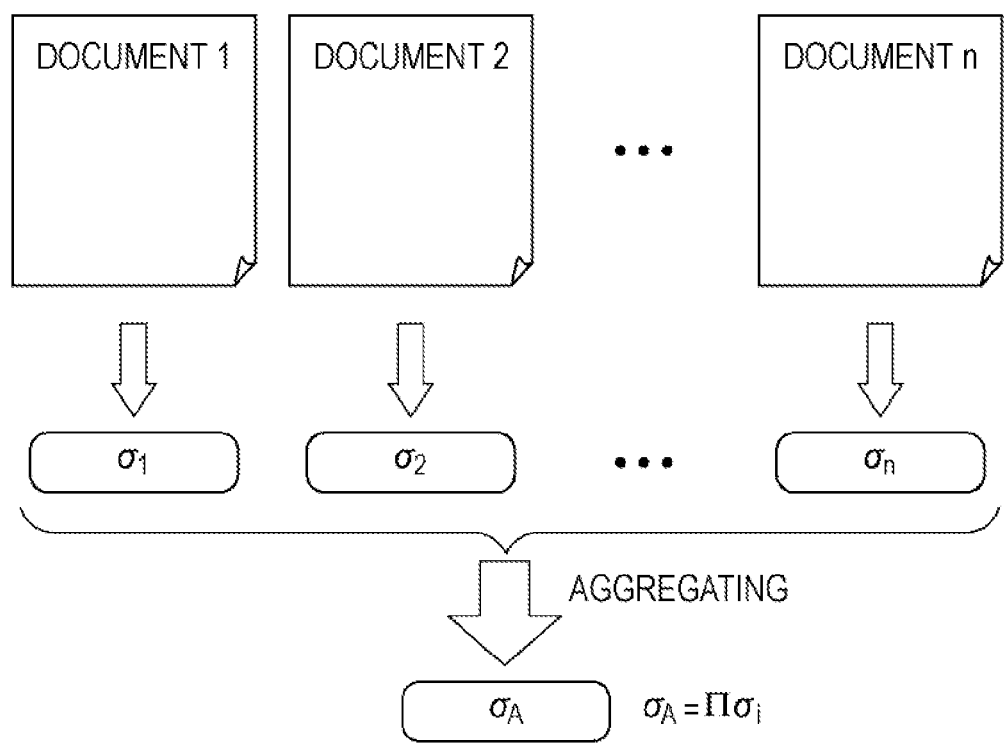
FIG. 15 diagrammatically illustrates the concept of an aggregate signature.
Figure 16:
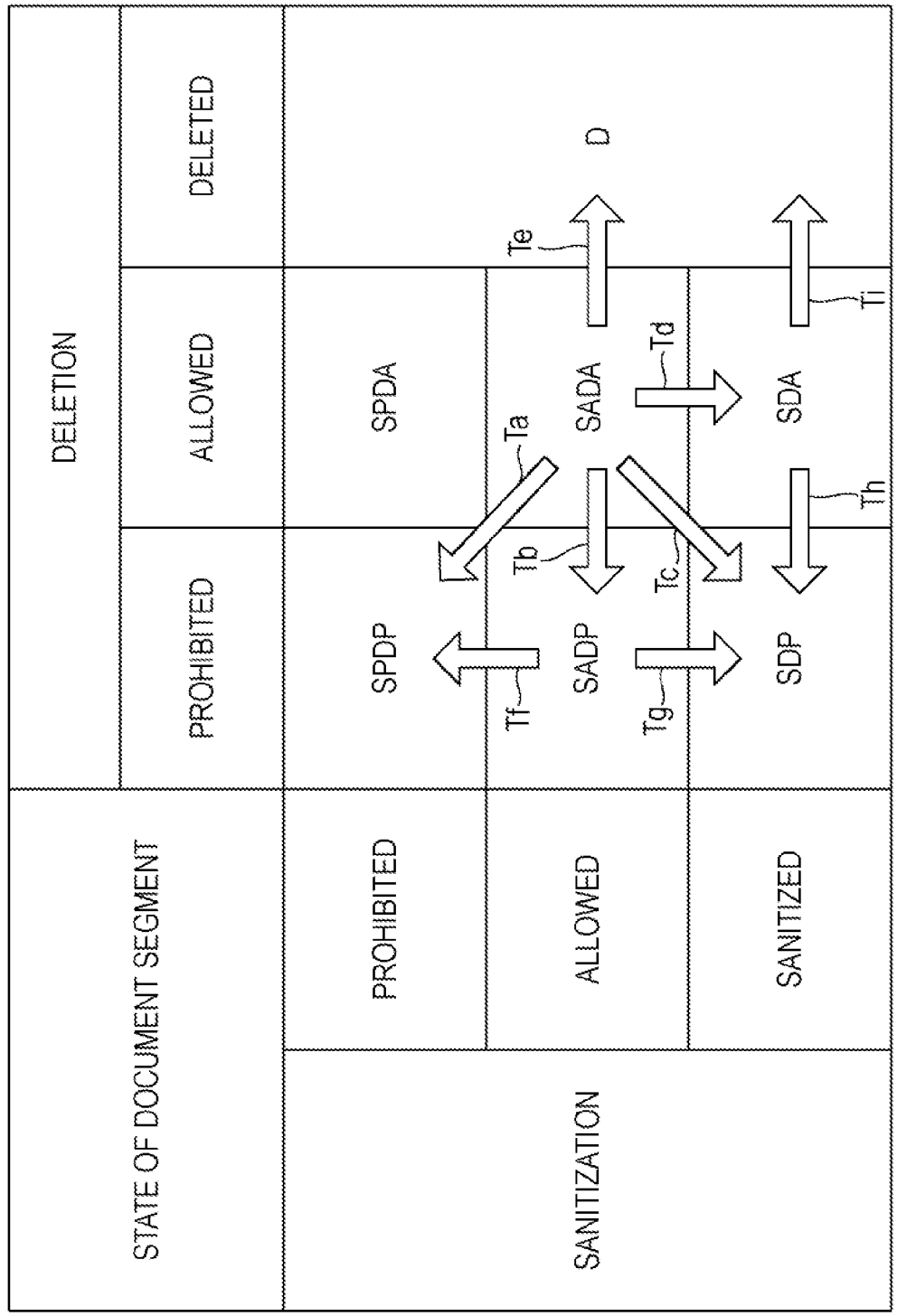
FIG. 16 illustrates the states of document segments and the state transitions of the document segments.

An algorithm of the verification process executed by the electronic document management apparatus 103 is described below. FIGS. 8A and 8B are flowcharts illustrating the algorithm of an electronic document revising process executed by the electronic document management apparatus 103.

As illustrated in FIG. 8A, the input unit E01 in the electronic document management apparatus 103 determines whether or not the signed document M and the signature (s,t) have been received (V1). If the signed document M and the signature (s,t) have been received, the partitioner E02 partitions the electronic document M into document segments (V2). The input unit E01 receives not only the signed electronic document M but also the revised document R.

In the signed electronic document M, all the document segments are in the sanitization allowed and deletion allowed state. In the revised document R, each document segment may be in one of the six states: the sanitization prohibited and deletion prohibited (SPDP) state, the sanitization allowed and deletion prohibited (SADP) state, the sanitized and deletion prohibited (SDP) state, the sanitization prohibited and deletion allowed (SPDA) state, the sanitization allowed and deletion allowed (SADA) state, and the sanitized and deletion allowed (SDA) state. It is noted that no document segment in the deleted state remains because such a document segment is deleted.

The hash unit D08 then performs a signature verification process on the signature s, thereby converting the signature s into v=Verify(s) (V3). A digital signature of a message recovery type, such as the RSA signature, is used in the signing and signature verification. The storage of a value $(g^{r\Pi hihi})$ aggregated by the RSA accumulator and the signature $(Sig(g^r_{\Pi hihi}))$ therefore allows another signature (such as DSA signature or ECDSA signature) to be used in the above-described process.

The following process is repeated for each of the document segments (V4). If no unprocessed document segment remains, the determiner E09 determines whether or not the revised data (v,t) matches (V5). If v=t, the output unit E05 outputs an OK (approval) signal meaning that the signature is correct (V6). If v≠t, the output unit E05 outputs an NG (failure) signal meaning that the signature is incorrect (V7).

FIG. 8B illustrates the process repeated for each of the document segments. The determiner E03 determines the current state of each document segment. The determiner E03 then branches to a corresponding subroutine depending on one of the six states of the sanitization prohibited and deletion prohibited (SPDP) state, the sanitization allowed and deletion prohibited (SADP) state, the sanitized and deletion prohibited (SDP) state, the sanitization prohibited and deletion allowed (SPDA) state, the sanitization allowed and deletion allowed (SADA) state, and the sanitized and deletion allowed (SDA) state.

If the document segment mi is in the sanitization prohibited and deletion prohibited (SPDP) state, the hash unit E06 converts the document segment mi into the hash value hi=H(mi) and the double hash value di=H(H(mi)) (V11). The aggregator E07 raises the signature t to the power of the hash value hi, thereby revising the signature t to be $t=t^{hi}$ (V12). The aggregator E07 raises the signature v to the power of the hash value di, thereby revising the signature v to be $v=v^{di}$ (V13). Processing returns to entry point F002.

If the document segment mi is in the sanitization allowed and deletion prohibited (SADP) state, the setter D06 converts the document segment mi into the hash value hi=H(mi) and the double hash value di=H(H(mi)) (V21). The aggregator E07 twice raises the signature t to the power of the hash value hi, thereby revising the signature t to be $t=t^{hihi}$ (V22). The aggregator E07 raises the signature v to the power of the hash value di, thereby revising the signature v to be $v=v^{di}$ (V23). Processing returns to entry point F002.

If the document segment mi is in the sanitized and deletion prohibited (SDP) state, the document segment mi is already revised to be mi=hi. The hash unit E06 converts the document segment mi(hi) into the double hash value di=H(hi) (V31). The aggregator E07 raises the signature t to the power of the hash value hi, thereby revising the signature t to be $t=t^{hihi}$ (V32). The aggregator E07 raises the signature v to the power of the hash value di, thereby revising the signature v to be $v=v^{di}$ (V33). Processing returns to entry point F002.

If the document segment mi is in the sanitization prohibited and deletion allowed (SPDA) state, the hash unit E06 converts the document segment mi into the hash value hi=H(mi) (V41). The aggregator E07 raises the signature t to the power of the hash value hi, thereby revising the signature t to be $t=t^{hi}$. The state is then deleted, and processing returns to entry point F002.

If the document segment mi is in the sanitization allowed and deletion allowed (SADA) state, the hash unit E06 converts the document segment mi into the hash value hi=H(mi) (V51). The aggregator E07 twice raises the signature t to the power of the hash value hi, thereby revising the signature t to be $t=t^{hihi}$ (V52). The state is then deleted, and processing returns to entry point F002.

If the document segment mi is in the sanitized and deletion allowed (SDA) state, the document segment mi is already revised to be mi=hi as denoted in V61. The aggregator E07 twice raises the signature t to the power of the hash value hi, thereby revising the signature t to be $t=t^{hihi}$ (V62). The state is then deleted, and processing returns to entry point F002.

Figure 21:
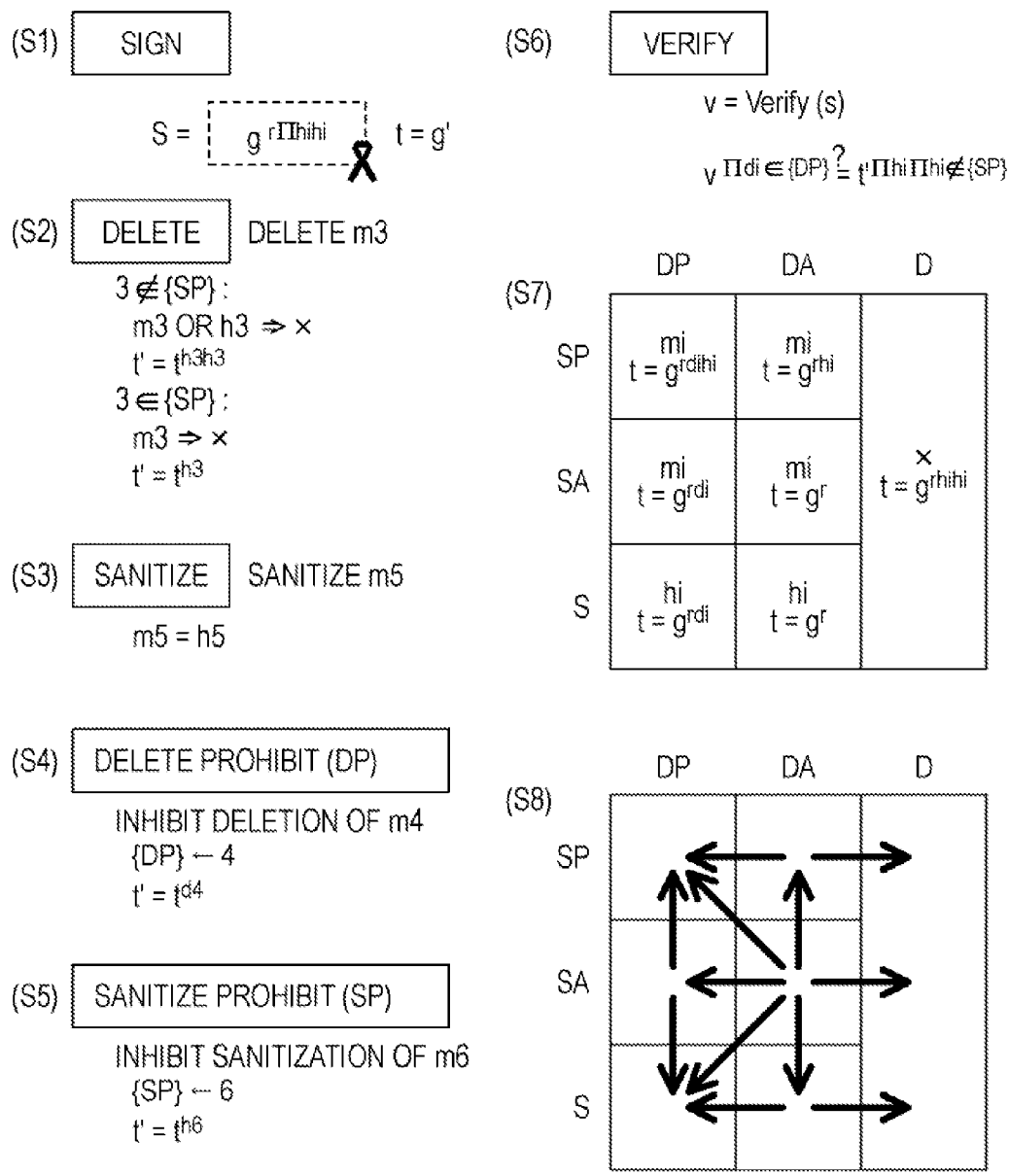
FIG. 21 illustrates the concept of the embodiment.

FIG. 9 illustrates the seven states implemented by the above-described embodiment. FIG. 10 lists state transitions. FIG. 21 illustrates the concept of the above-described embodiment.

In S1, the target electronic document is partitioned into the plurality of document segments (mi), and the signature s as the signature of the electronic document and the signature t for use in revising of the document segment are generated. The signature t is initialized while the signature s is produced by twice raising the signature t to the power of each of all the hash values of the document segments and by digitally signing the resulting raised signature $(s=t^{\Pi hihi})$.

In S2, in order to delete a document segment m3 or delete a sanitized portion (a hash value h3 replacing the document segment 3), the signature t is twice raised to the power of the hash value of the document segment deleted ($t \rightarrow t' = t^{h3h3}$) except when the document segment 3 is in the sanitization prohibited state. In the sanitization prohibited state, the signature t is raised to the power of the hash value of the deleted document segment ($t \rightarrow t^{h3}$). In each case, the document segment (m3) or the hash value (h3) is deleted.

In S3, a document segment (m5) is sanitized. The document segment is replaced with the hash value thereof (m5→h5).

In S4, a document segment (m4) is deletion prohibited. The signature t is raised to the power of the double hash value (di=H(H(mi))) of the document segment in the deletion prohibited state ($t \rightarrow t^{d4}$).

In S4, a document segment (m6) is sanitization prohibited. The signature t is thus raised to the hash value of the document segment in the sanitization prohibited state ($t \rightarrow t^{h4}$).

The signature t has been updated as described above.

In S5, the verification of v=Verify(s) is performed by comparing the value of $v^{\Pi di}$ of the document segment in the deletion prohibited state with the value of $t^{\Pi hi \Pi hi}$ of the document segment not in the sanitization prohibited state. The values of t resulting from the operation in S6 are listed in FIG. 9. The state transitions in S7 are listed in FIG. 10.

As described above, the document segment may be set to be in the sanitization prohibited and deletion allowed state in accordance with the embodiment. The amount of signature information is not proportional to the number of document segments and the segment document is usually revised using two signatures (s,t). The electronic document is thus flexibly revised, and user friendliness is improved.

The digital signature apparatus, the digital signature program, and the digital signature method guarantee the integrity of the electronic document while reducing the amount of data during signing and revision.

The digital signature program is provided by supplying a program causing a computer to execute operations described in the steps and the flowcharts of the embodiments illustrated in the drawings. The program may be recorded onto a computer readable medium to be executed by the computer. The computer may include a host apparatus, such as a personal computer, a controller in a test apparatus, a controller such as a micro-processor unit (MPU), or a central processing unit (CPU) on a storage device. The computer readable media include a removable storage medium such as a compact disk ROM (CD-ROM), a flexible disk, a digital versatile disk (DVD), a magnetooptical-disk, or an IC card, a database storing the computer program, another computer, a database on the other computer, and a transmission medium on a transmission line.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A digital signature method for causing a computer to generate a signature for an electronic document, the method comprising:
    partitioning a target electronic document into a plurality of document segments;
    initializing a signature t of each of the document segments and twice raising the signature t to the power of a hash value of each of the document segments and digitally signing the raised signature to produce a signature s serving as the signature of the electronic document; and
    revising a document segment;
    wherein, in the revising,
    to delete a document segment, the signature t is raised twice to the power of the hash value of the document segment to be deleted unless the document segment is sanitization prohibited, or the signature t is raised to the power of the hash value of the document to be deleted if the document segment is sanitization prohibited, and the document segment is deleted;
    to sanitize a document segment, the document segment is replaced with the hash value thereof;
    to prohibit a document segment from being deleted, the signature t is raised to the power of a double hash value of the document segment to be prohibited from being deleted; and
    to prohibit a document segment from being sanitized, the signature t is raised to the power of the hash value of the document segment to be prohibited from being sanitized.

2. The digital signature method according to claim 1, wherein a document segment mi to be revised has the signature t with a current state of the document segment being a sanitization allowed and deletion allowed state,
    wherein, if the document segment is to be revised to a sanitization prohibited and deletion allowed state, the signature t is revised to $t^{hi}$, and the document segment mi remains unchanged;
    wherein, if the document segment is to be revised to the sanitization allowed and deletion prohibited state, the signature t is revised to $t^{di}$ and the document segment mi remains unchanged;
    wherein, if the document segment is to be revised to a sanitization prohibited and deletion prohibited state, the signature t is revised to $t^{hidi}$ and the document segment mi remains unchanged;
    wherein, if the document segment is to be revised to a sanitized and deletion allowed state, the signature t remains unchanged, and the document segment is revised from mi to hi;
    wherein, if the document segment is to be revised to a sanitized and deletion prohibited state, the signature t is revised to $t^{di}$ and the document segment is revised from mi to hi; and
    wherein, if the document segment is to be revised to a deleted state, the signature t is revised to $t^{hihi}$ and the document segment mi is deleted.

3. The digital signature method according to claim 2, wherein a state setting operation is performed on each of the document segments so that the state is determined.

4. The digital signature method according to claim 1, wherein the signature t is initialized using a random number.

5. The digital signature method according to claim 1, wherein a verification operation is performed based on the signature s and a revised signature t to verify that an electronic document produced by a signer has been revised.

6. A non-transitory storage medium storing a program for causing a computer to perform a digital signature method generating a signature on an electronic document, the program comprising:

receiving a combination of the electronic document, a signature s of the electronic document, and a signature t for revising an initialized document segment, the signature s resulting from twice raising the signature t to the power of a hash value for each of the document segments and digitally signing the raised signature; and revising of a document segment;

wherein in the revising, to delete a document segment, the signature t is raised twice to the power of the hash value of the document segment to be deleted unless the document segment is sanitization prohibited, or the signature t is raised to the power of the hash value of the document to be deleted if the document segment is sanitization prohibited, and then document segment is deleted;

to sanitize a document segment, the document segment is replaced with the hash value thereof;

to prohibit a document segment from being deleted, the signature t is raised to the power of a double hash value of the document segment to be prohibited from being deleted; and to prohibit a document segment from being sanitized, the signature t is raised to the power of the hash value of the document segment prohibited from being sanitized.

7. The non-transitory storage medium according to claim 6, wherein a document segment mi to be revised has the signature t with a current state thereof being in a sanitization allowed and deletion allowed state, wherein, if the document segment is to be revised to a sanitization prohibited and deletion allowed state, the signature t is revised to $t^{hi}$, and the document segment mi remains unchanged;

wherein, if the document segment is to be revised to a sanitization allowed and deletion prohibited state, the signature t is revised to $t^{di}$ and the document segment mi remains unchanged;

wherein, if the document segment is to be revised to a sanitization prohibited and deletion prohibited state, the signature t is revised to $t^{hidi}$ and the document segment mi remains unchanged;

wherein, if the document segment is to be revised to a sanitized and deletion allowed state, the signature t remains unchanged, and the document segment is revised from mi to hi;

wherein, if the document segment is to be revised to a sanitized and deletion prohibited state, the signature t is revised to $t^{di}$ and the document segment is revised from mi to hi; and wherein, if the document segment is to be revised to a deleted state, the signature t is revised to $t^{hihi}$ and document segment mi is deleted.

8. The non-transitory storage medium according to claim 7, wherein a state setting operation is performed on each of the document segments so that the state is determined.

9. The non-transitory storage medium according to claim 6, wherein the signature t is initialized using a random number.

10. The non-transitory storage medium according to claim 6, wherein a verification operation is performed based on the signature s and a revised signature t to verify that the electronic document produced by a signer has been revised.

11. A digital signature apparatus for generating a signature of an electronic document, the apparatus comprising:

a receiver for receiving a combination of the electronic document, a signature s of the electronic document, and a signature t for revising an initialized document segment, the signature s resulting from twice raising the signature t to the power of a hash value of each of the document segments and digitally signing the raised signature; and an electronic document reviser, wherein, the electronic document reviser partitions a target electronic document into a plurality of electronic documents during revising of the document segment, wherein, to delete a document segment, the signature t is raised twice to the power of the hash value of the document segment to be deleted unless the document segment is sanitization prohibited, or the signature t is raised to the power of the hash value of the document to be deleted if the document segment is sanitization prohibited, and the document segment is deleted, wherein, to sanitize a document segment, the document segment is replaced with the hash value thereof, wherein, to prohibit a document segment from being deleted, the signature t is raised to the power of a double hash value of the document segment to be prohibited from being deleted, and wherein, to prohibit a document segment from being sanitized, the signature t is raised to the power of the hash value of the document segment to be prohibited from being sanitized.

12. The digital signature apparatus according to claim 11, wherein a document segment mi to be revised has the signature t with a current state of the document segment being a sanitization allowed and deletion allowed state, wherein, if the document segment is to be revised to a sanitization prohibited and deletion allowed state, the signature t is revised to $t^{hi}$, and the document segment mi remains unchanged;

wherein, if the document segment is to be revised to a sanitization allowed and deletion prohibited state, the signature t is revised to $t^{di}$ and the document segment mi remains unchanged;

wherein, if the document segment is to be revised to a sanitization prohibited and deletion prohibited state, the signature t is revised to $t^{hidi}$ and the document segment mi remains unchanged;

wherein, if the document segment is to be revised to a sanitized and deletion allowed state, the signature t remains unchanged, and the document segment is revised from mi to hi;

wherein, if the document segment is to be revised to a sanitized and deletion prohibited state, the signature t is revised to $t^{di}$ and the document segment is revised from mi to hi; and wherein, if the document segment is to be revised to a deleted state, the signature t is revised to $t^{hihi}$ and the document segment mi is deleted.

13. The digital signature apparatus according to claim 12, further comprising a designator for designating a state of each of the document segments so that the state is determined.

14. The digital signature apparatus according to claim 11, wherein the receiver initializes the signature t with a random number.

15. The digital signature apparatus according to claim 11, further comprising a verifying unit for verifying, based on the signature s and the revised signature t, that the electronic document produced by a signer has been revised.

* * * * *